US008553884B2

United States Patent
Shields et al.

(10) Patent No.: US 8,553,884 B2
(45) Date of Patent: Oct. 8, 2013

(54) QUANTUM COMMUNICATION SYSTEM

(75) Inventors: Andrew James Shields, Cambridge (GB); Zhiliang Yuan, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/421,045

(22) Filed: Mar. 15, 2012

(65) Prior Publication Data

US 2012/0177134 A1    Jul. 12, 2012

Related U.S. Application Data

(62) Division of application No. 10/890,286, filed on Jul. 14, 2004, now Pat. No. 8,306,225.

(30) Foreign Application Priority Data

Jul. 15, 2003    (GB) .................................. 0316563.6

(51) Int. Cl.
*H04K 1/00* (2006.01)
(52) U.S. Cl.
USPC ............. 380/256; 380/28; 380/255; 713/168
(58) Field of Classification Search
None
See application file for complete search history.

(56) References Cited

U.S. PATENT DOCUMENTS

| 5,307,410 | A | * | 4/1994 | Bennett ......................... 380/256 |
| 5,757,912 | A | | 5/1998 | Blow |
| 5,953,421 | A | | 9/1999 | Townsend |
| 6,272,224 | B1 | | 8/2001 | Mazourenko et al. |
| 6,438,234 | B1 | * | 8/2002 | Gisin et al. ..................... 380/256 |
| 6,529,601 | B1 | | 3/2003 | Townsend |
| 7,333,611 | B1 | * | 2/2008 | Yuen et al. ..................... 380/256 |
| 2003/0043467 | A1 | | 3/2003 | Rosenfeldt |
| 2004/0161109 | A1 | | 8/2004 | Trifonov |

FOREIGN PATENT DOCUMENTS

| GB | 2368502 A | 5/2002 |
| JP | 2000-101570 | 4/2000 |
| WO | WO 01/86855 A2 | 11/2001 |

OTHER PUBLICATIONS

Communication pursuant to Article 94(3) EPC issued Jun. 27, 2011 in Application No. 04 254 232.4-2415.

* cited by examiner

*Primary Examiner* — Shewaye Gelagay
(74) *Attorney, Agent, or Firm* — Oblon, Spivak, McClelland, Maier & Neustadt, L.L.P.

(57) ABSTRACT

A quantum communication system including an emitter and a receiver, the emitter including an encoder and at least one photon source and being configured to pass a signal pulse and a reference pulse, which are separated in time, through the encoder and output the signal pulse and the reference pulse. The reference pulse has a higher probability of containing more than one photon than the signal pulse. The receiver includes a decoder and at least one detector for measuring the signal pulse and the reference pulse.

15 Claims, 9 Drawing Sheets

Figure 1: Prior Art

Figure 7 with single photon source

QUANTUM COMMUNICATION SYSTEM

CROSS-REFERENCE TO RELATED APPLICATIONS

This application is a division of and claims the benefit of priority under 35 U.S.C. §120 from U.S. Ser. No. 10/890,286 filed Jul. 14, 2004 (now U.S. Pat. No. 8,306,225 issued Nov. 6, 2012), the entire contents of which are incorporated herein by reference.

BACKGROUND OF THE INVENTION

1. Field of the Invention

The present invention is concerned with the field of quantum communication systems and emitters and receivers which may be used in such systems. Specifically, the present invention is concerned with the use of a reference pulse in a quantum communication system in order to provide active stabilisation of the system.

2. Discussion of Background

In quantum communication systems, information is transmitted between a sender and a receiver by encoded single quanta, such as single photons. Each photon carries one bit of information encoded upon a property of the photon, such as its polarisation, phase or energy/time. The photon may even carry more than one bit of information, for example, by using properties such as angular momentum.

Quantum key distribution which is a technique for forming a shared cryptographic key between two parties; a sender, often referred to as "Alice", and a receiver often referred to as "Bob". The attraction of this technique is that it provides a test of whether any part of the key can be known to an unauthorised eavesdropper (Eve). In many forms of quantum key distribution, Alice and Bob use two or more non-orthogonal bases in which to encode the bit values. The laws of quantum mechanics dictate that measurement of the photons by Eve without prior knowledge of the encoding basis of each causes an unavoidable change to the state of some of the photons. These changes to the states of the photons will cause errors in the bit values sent between Alice and Bob. By comparing a part of their common bit string, Alice and Bob can thus determine if Eve has gained information.

Examples of quantum communication systems are described in GB 2 368 502 from the current applicant.

When the photons are encoded using phase, typically, a Mach-Zender interferometer is provided in both Alice's sending equipments and Bob's receiving equipment. Each interferometer has a long path and a short path. Details of how the photons are encoded using this arrangement will be described later. However, it is required that photons that contribute to the key or the encoded information through the short arm of one interferometer and the long arm of the other interferometer. Thus, the photons may follow one of two paths: Path 1, the short arm of Alice's interferometer and the long arm of Bob's interferometer; and Path 2, the long arm of Alice's interferometer and the short arm of Bob's interferometer.

Both interferometers will contain a phase modulator which can be used to either randomly vary the phase of photons passing through the interferometer either randomly or under the control of either Alice or Bob.

However, it is necessary that any other phase delay between Path 1 and Path 2 is constant throughout transmission as any other phase delay can increase the quantum bit error rate and can even make the system unusable if it exceeds a certain level. Thus, in practice, one has to calibrate the phase delay every several tens of seconds or several minutes depending on the stability of the system. This introduces a dead time to the system. Also, during key distribution, no information concerning the phase drift can be obtained. This causes extra difficulties in identifying the presence of an eavesdropper as Alice and Bob cannot identify the source of the quantum bit error rate. It can arise from either an eavesdropper or a variation in the phase drift.

It is also required that the polarisation of photons be stabilised. However, this presents difficulties as photons will generally be sent from Alice to Bob along a single mode fibre link and the polarisation of photons passing through this link will vary due to birefringence regions commonly existing in the single mode fibre. For example, variations in the temperature can cause the polarisation to vary randomly. It is necessary to be able to correct any rotation of the polarisation which has occurred in the fibre link because some of the components of Bob's equipment are polarisation sensitive and variations in the polarisation will again result in a higher error rate. Also, the bit rate of the system may decrease in equipment where polarisation beam splitters are used to ensure that photons pass through the short arm of one interferometer and the long arm of the other.

SUMMARY OF THE INVENTION

The present invention attempts to address the above problems and, in a first aspect provides a quantum communication system comprising an emitter and a receiver, said emitter comprising encoding means and at least one photon source, said emitter being configured to pass a signal pulse and a reference pulse, which are separated in time, through said encoding means and output the signal pulse and the reference pulse, said reference pulse having a higher probability of containing more than one photon than said signal pulse, said receiver comprising decoding means and at least one detector for measuring said signal pulse and said reference pulse.

By outputting a reference pulse which passes through the encoding means as well as the signal pulse, the reference pulse may be measured in order to determine variations in the system, for example, phase variations and polarisation variations.

By outputting a reference pulse and a signal pulse through the same encoding means it is possible to output a reference pulse for each signal pulse. This allows any variations in phase or polarisation of the system to be monitored during transmission of a key. Thus, Alice and Bob can determine if an increase in the bit error rate is due to an eavesdropper or due to phase or polarisation drift.

Further, preferably, the receiver comprises feedback means for altering a component of the receiver on the basis of the measured reference signal. For example, the component may be a means to alter the polarisation or phase of photons, specifically, the component may be a polarisation rotation, delay line or phase modulator. Thus, the system may be actively balanced or aligned during transmission of the key.

Typically, the reference pulse will be 10 to 10,000 times stronger than the signal pulse.

In a preferred embodiment, the encoding means are phase encoding means comprising an encoding interferometer with an entrance member connected to a long arm and a short arm, said long arm and said short arm being joined at their other ends by an exit member, one of the said arms having a phase modulator which allows the phase of a photon passing through that arm to be set to one of at least two values.

Where the encoding means comprises an interferometer, the decoding means should also comprise a decoding interferometer, said decoding interferometer comprising an entrance member connected to a long arm and a short arm, said long arm and said short arm being joined at their other ends by an exit member, one of said arms having a phase modulator which allows the phase of a photon passing through that arm to be set to at least one of two values.

Typically, the phase modulators will be provided in the short arms. However, the phase modulators may also be provided in the long arms of both interferometers. Only photons which have passed through the long arm of one interferometer and the short arm of the other are of use in communicating the key. In the four-state protocol, which is sometimes referred to as BB84, Alice modulates her phase modulator to one of four different values, corresponding to phase shifts of 0°, 90°, 80° and 270°. Phase 0° and 180° are associated with bits 0 and 1 in a first encoding basis, while 90° and 270° are associated with bits zero and one in a second encoding basis. The second encoding basis is chosen to be non-orthogonal to the first.

Information may alternatively be sent using the B92 protocol where Alice applies phase shifts of 0° and 90° on her phase modulator randomly. Alice associates 0° with bit=0 and 90° delay with bit=1. Bob applies 180° or 270° to his phase modulator randomly and associates 180° with bit=1 and 270° with bit=0.

In order to increase the bit rate, it is preferable for the system to comprise polarisation directing means for directing photons which have passed through the long arm of the encoding interferometer through the short arm of the decoding interferometer and for directing photons which have passed through the short arm of the encoding interferometer through the long arm of the decoding interferometer.

These means may be achieved by configuring the encoding interferometer to ensure that photons which have passed through the long arm of the interferometer exit the interferometer with a first polarisation and photons which have passed through the short arm of the interferometer exit the interferometer with a second polarisation. The first polarisation being orthogonal to the second polarisation direction. A polarisation beam splitter may then be provided as the entrance member to the decoding interferometer to direct photons with the first polarisation along the short arm of the decoding interferometer and photons with the second polarisation through the long arm of the decoding interferometer.

The reference pulse and the signal pulse pass through the encoding means in the same manner. However, to avoid an eavesdropper obtaining information about the signal pulse from the reference pulse, the reference pulse is either not encoded as it passes through the interferometer, for example, the phase modulator is switched to a fixed encoding position for the reference pulse or the reference pulse is encoded in a different manner to that of the signal pulse. The coding of the reference pulse may be decided between Alice and Bob before transmission begins so that Bob can correctly measure the reference pulse.

The receiver comprises at least one detector for measuring said signal pulse and the reference pulse. As the reference pulse and the signal pulse arrive at the receiver at different times, it is possible to use a single detector to monitor both the signal and reference pulses. However, this is not advantageous because typically, avalanche photo diodes are used as the detectors. When one of these detectors detects a photon, a large number of charge carriers are generated within the diode forming an easily detectable current. Some of these carriers may be localised at hetero-junctions or at trap states within the semiconductor. Carriers confined in these traps can have a lifetime of several microseconds. Therefore, the diode can only be used once the trapped carriers have decayed and thus the detector has a fixed sampling rate which is usually the limiting factor in the information bit rate of the system. Thus, although it is possible, it is not desirable to have the same detector detecting both the reference and signal pulses.

Previously, a system has been described comprising polarisation directing means which ensures that photons which pass along the long path of one interferometer pass through the short path of the other interferometer. In such a system, where there is no variation in the polarisation due to the passage of photons through the fibres, a reference detector provided at an output of the exit member of the decoding interferometer would expect to just detect a single reference peak due to photons flowing along the long path of one interferometer and the short path of the other. However, if the polarisation of the photons is varied during their passage though the emitter and receiver or though the fibre link connecting the emitter and receiver, some photons will flow along both long paths through the interferometers and some photons will pass through both short paths of the two interferometers. Thus, an early satellite peak is seen due to photons which pass through the two short arms and a late satellite peak is seen due to photons which pass through the two long arms. Thus, the reference detector may be configured to monitor either the late or early satellite peak. The presence of either of these peaks indicates that the polarisation of the photons is being rotated as it passes through the fibres of the system.

The reference pulse will be outputted from one of two ports of the exit member of the decoding interferometer. Typically, the exit member will be a fibre coupler. The phase of the encoding phase modulator and the phase of the decoding phase modulator may be set to ensure that the reference pulse is directed to the port which outputs to the reference detector.

Preferably, the receiver comprises a polarisation rotator positioned in the photon path prior to the decoding means. The reference detector may be connected to a feedback circuit which controls the polarisation rotator in order to correct the polarisation directions prior to the decoding means.

It is also desirable to correct for any rotations in the polarisation direction in systems which do not use polarisation in order to direct photons down the desired arms of the interferometers. One reason for this is that phase modulators are sensitive to the polarisation direction, variations in the polarisation may still increase the bit error rate. In systems which do not use polarisation directing means, photons in the emitter are generally outputted with just a single polarisation direction.

This polarisation direction may be monitored by inserting a polarisation beam splitter before the decoding means in the receiver. The polarisation beam splitter is configured to pass photons with the desired polarisation and reflect photons with an orthogonal polarisation into a reference detector. Preferably, the reference detector is connected to a feedback circuit which is in turn connected to a polarisation controller provided in the photon path before the polarisation beam splitter. Thus, the polarisation controller may be used to correct the rotation of the polarisation to minimise the signal at the reference detector.

The reference pulse may also be used to stabilise and monitor the phase of the system. The reference detector will be connected to one of the outputs of the decoding interferometer's exit member. The exit member will typically be a fibre coupler. If the phase of the system remains stable (except for the phase changes introduced by the phase modulators of the interferometers), then a constant count rate is expected at the reference detector. Any variation in the phase drift of the system will be manifested by a varying count rate. Thus, by monitoring the arrival time of the reference peaks, any variations in the count rate may be established. Preferably, integration means are provided so that the count rate may be integrated over a period of time in order to average statistical fluctuations in the arrival rate of the reference pulse. The integration time may typically be a fraction of a second, for example, 0.1 seconds.

Preferably, the reference detector is connected to a feedback circuit which is in turn connected to a phase correcting means provided in one of the arms of the decoding interferometer. The phase correcting means may be provided by a variable fibre stretcher or a variable air gap, etc. Alternatively, the phase correcting means may be provided by an adjustment means for the phase modulator of the receiver to allow the phase to be balanced. In other words, feedback is used to re-calibrate the zero points of the phase modulators. Thus, the interferometer phase may be balanced using the results from the reference detector.

The phase reference detector may be used to monitor the central reference pulse to monitor variations in the phase alone. However, if polarisation direction control means are provided in the system, then the reference monitoring may be used to monitor either the early or late satellite peaks in order to calibrate both the polarisation and the phase at the same time.

In the B92 communication protocol, it is only necessary to use one detector for the signal peak. Therefore, the system may be arranged with a signal pulse detector connected to one output of the exit member and reference pulse detector connected to the other output of the exit member.

In the BB84 protocol, two signal pulse detectors are required, one connected to one output of the exit member and the other connected to the other output of the exit member. In this arrangement, both the reference detector and a signal pulse detector may be connected to the same output of the exit member. A fibre couple may be provided to direct photons from the port of the exit member into either the reference detector or the signal pulse detector.

The reference pulse will contain more photons than the signal pulse. Therefore, the detector coupler is typically a coupling ratio of 95/5 is used with the 95% port attached to the signal pulse detector and the 5% port attached to the reference pulse detector. This is chosen to ensure that the reference pulse detector does not reduce the photon count rate of the signal pulses significantly at the signal pulse detector. As the reference pulse will contain many photons, even with a high coupling ratio, the reference detector should still receive some photons of the reference pulse. As the reference pulse and the signal pulse arrive at the detectors at different times, the signal pulse detector can be switched off when the reference pulse arrives and is thus not affected by the reference pulse photons.

In order to create both the signal pulse and reference pulse, the emitter may comprise a separator for dividing photon pulses emitted from a photon source into a signal pulse and a reference pulse.

The separator may comprise an entrance member, for example, a fibre coupler, connected to a long arm and short arm, said long arm and said short arm being connected at the other ends to an exit member. Typically, the exit member will also be a fibre coupler.

As the reference pulse needs to be larger than the signal pulse, the coupler may be an asymmetric coupler and may allow 90 to 99.99% of the input along one arm to form the reference pulse. The reference pulse may either just proceed the signal pulse or may be delayed after the signal pulse.

The exit member of the separator is also preferably a coupler. The coupler will have two output ports and the photons will exit through just one of the output ports into the encoding interferometer or other encoding means. In an alternative arrangement, the entrance member of the encoding interferometer is provided by the exit member of the separator.

Typically, the separator is configured to introduce a time delay of about 10 ns.

Alternately, the reference pulse and the signal pulse may be generated by separate sources. For example, a laser diode may be used to generate the reference pulse and a dedicated single photon source may be used to generate the signal pulse. Delay means will be provided in order to delay the reference pulse with respect to the signal pulse.

As previously explained, the detectors for both the reference pulse and the signal pulse may be avalanche photo diodes. Preferably, the receiver comprises a gating means in order to keep the detectors in an on mode only for the time when they expect to receive a signal pulse or a reference pulse.

In a second aspect, the present invention provides an emitter for a quantum communication system, said emitter comprising encoding means and at least one photon source, said emitter being configured to pass a signal pulse and a reference pulse, which are separated in time, through said encoding means and output the signal pulse and the reference pulse, said reference pulse having a higher probability of containing more than one photon than said signal pulse.

In a third aspect, the present invention provides a receiver for a quantum communication system, said receiver comprising decoding means and at least one detector for measuring a signal pulse and a reference pulse, said signal pulse and said reference pulse being separated in time and said reference pulse having a higher probability of containing more than one photon than said signal pulse.

In a fourth aspect, the present invention provides a method of communicating photon pulses from an emitter to a receiver, comprising generating a signal pulse and a reference pulse separated in time in an emitter; passing both the signal pulse and the reference pulse through the same encoding means in said emitter and sending said pulses to a receiver; and measuring both the signal pulse and the reference pulse in said receiver.

In a fifth aspect, the present invention provides a method of outputting photons from an emitter, the method comprising generating a signal pulse and a reference pulse separated in time in an emitter; passing both the signal pulse and the reference pulse through the same encoding means in said emitter and outputting said pulses.

The present invention will now be described with reference to the following non-limiting embodiments in which:

BRIEF DESCRIPTION OF THE DRAWINGS

FIG. 2a is a plot of clock signal against time for the system of FIG. 1a, FIG. 2b is a plot of the output of the signal laser against time for the system of FIG. 1a, FIG. 2c is a plot of the probability of the photon arriving at either of Bob's detectors in the system of FIG. 1a, FIG. 2d is a plot of the modulator voltage against time for the systems of FIG. 1a and FIG. 2e is a plot of detector gating bias against time for the system of FIG. 1a;

FIG. 4a is a plot of the clock signal against time for the system of FIG. 3a, FIG. 4b is a plot of the signal laser output against time for the system of FIG. 3a, FIG. 4c is a plot of the probability of a photon arriving at either the reference detector or the signal detector of FIG. 3a, FIG. 4d is a plot of the modulator bias against time applied to the interferometers of FIG. 3, FIG. 4e is a plot of the gating voltage for the signal detector against time and FIG. 4f is a plot of the gating voltage applied to the reference detector of the system of FIG. 3a;

DETAILED DESCRIPTION OF THE PREFERRED EMBODIMENTS

Figure 1:
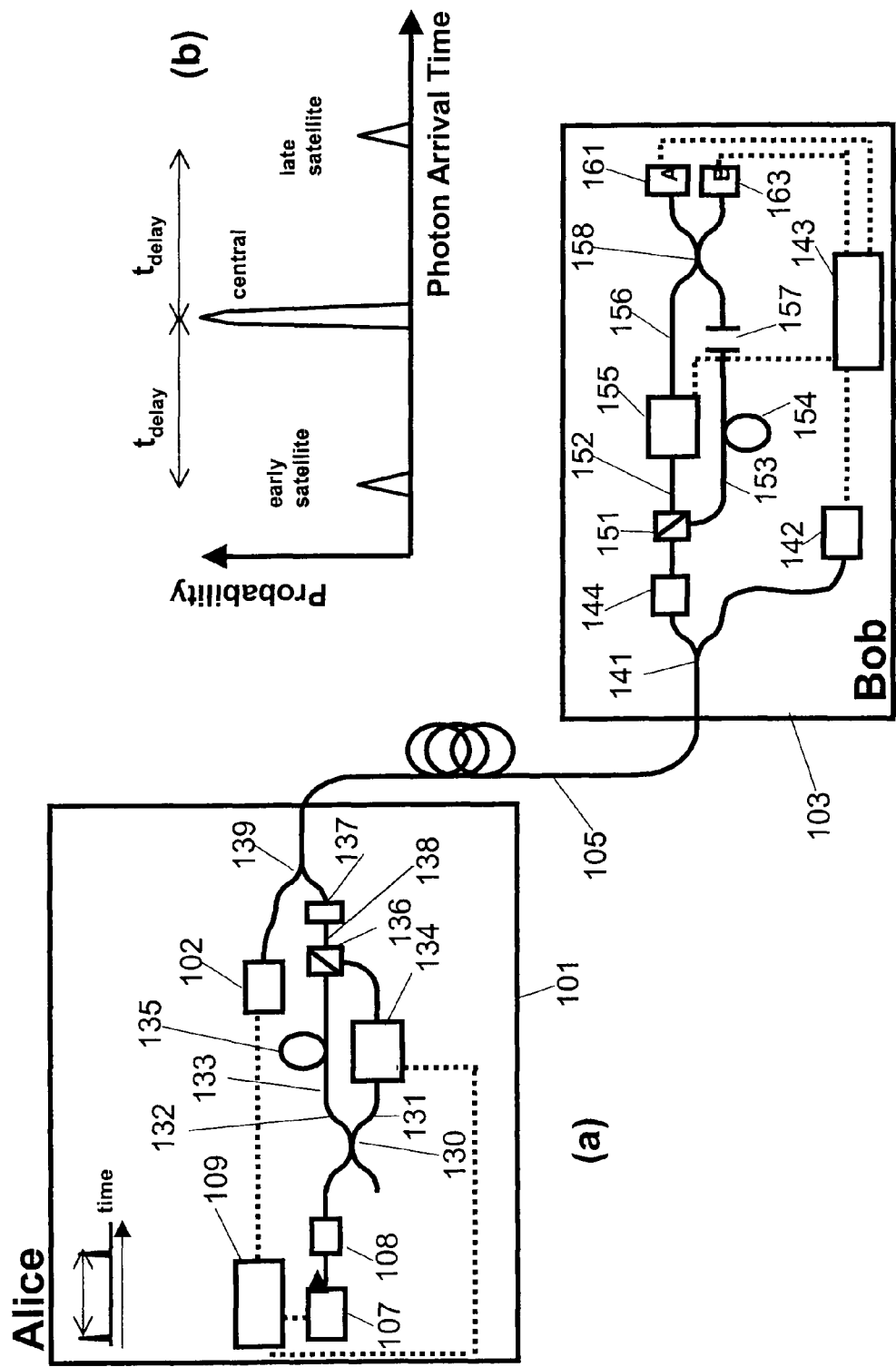
FIG. 1a is a known quantum communication system and FIG. 1b is a plot of the probability of a photon arriving at either of the detectors of the system of FIG. 1a against time.

FIG. 1a shows a prior art quantum cryptography system based upon phase encoding using a polarisation sensitive fibre interferometer.

The sender "Alice" 101 sends encoded photons to receiver "Bob" over optical fibre 105.

Alice's equipment 101 comprises a signal laser diode 107, a polarisation rotator 108 configured to rotate the polarisation of pulses from signal laser diode 107, an imbalanced fibre Mach-Zender interferometer 133 connected to the output of polarisation rotator 108, an attenuator 137 connected to the output of the interferometer 133, a bright clock laser 102, a wavelength division multiplexing (WDM) coupler 139 coupling the output from attenuator 137 and clock laser 102 and bias electronics 109 connected to said signal laser diode 107 and clock laser 102.

The interferometer 133 comprises an entrance coupler 130, one exit arm of entrance coupler 130 is joined to long arm 132, long arm 132 comprises a loop of fibre 135 designed to cause an optical delay, the other exit arm of entrance coupler 130 is joined to a short arm 131, short arm 131 comprises phase modulator 134 an exit polarising beam combiner 136 is connected to the other ends of long arm 132 and short arm 131. All components used in Alice's interferometer 133 are polarisation maintaining.

During each clock signal, the signal diode laser 107 outputs one optical pulse. The signal diode laser 107 is connected to biasing electronics 109 which instruct the signal diode laser 107 to output the optical pulse. The biasing electronics are also connected to clock laser 102.

The linear polarisation of the signal pulses outputted by diode laser 107 is rotated by a polarisation rotator 108 so that the polarisation of the pulse is aligned to be parallel to a particular axis of the polarisation maintaining fibre (usually the slow axis) of the entrance coupler 130 of the interferometer 133. Alternatively the polarisation rotator 108 may be omitted by rotating the signal laser diode 107 with respect to the axes of the entrance polarisation maintaining fibre coupler 130.

After passing through the polarisation from rotator (if present) the signal pulses are then fed into the imbalanced Mach-Zender interferometer 133 through a polarisation maintaining fibre coupler 130. Signal pulses are coupled into the same axis (usually the slow axis) of the polarisation maintaining fibre, of both output arms of the polarisation maintaining fibre coupler 130. One output arm of the fibre coupler 130 is connected to the long arm 132 of the interferometer while the other output arm of the coupler 130 is connected to the short arm 131 of the interferometer 133.

The long arm 132 of the interferometer 133 contains an optical fibre delay loop 135, while the short arm 131 contains a fibre optic phase modulator 134. The fibre optic phase modulator 134 is connected to biasing electronics 109 which will be described in more detail later. The length difference of the two arms 131 and 132 corresponds to an optical propagation delay of $t_{delay}$. Typically the length of the delay loop 135 may be chosen to produce a delay $t_{delay}$~5 ns. Thus, a photon travelling through the long arm 132 will lag that travelling through the short arm 131 by a time of $t_{delay}$ at the exit 136 of the interferometer 133.

The two arms 131, 132 are combined together with a polarisation beam combiner 136 into a single mode fibre 138. The fibre inputs of the polarisation beam combiner 136 are aligned in such a way that only photons propagating along particular axes of the polarisation maintaining fibre, are output from the combiner 136. Typically, photons which propagate along the slow axis or the fast axis are output by combiner 136 into fibre 138.

The polarising beam combiner 136 has two input ports, an in-line input port and a 90° input port. One of the input ports is connected to the long arm 132 of the interferometer 133 and the other input port is connected to the short arm 131 of the interferometer 133.

In this example, only photons polarised along the slow axis of the in-line input fibre of the in-line input port are transmitted by the polarising beam combiner 136 and pass into the fibre 138. Photons polarised along the fast axis of the in-line input fibre of the input port are reflected and lost.

Meanwhile, at the 90° input port of the beam coupler 136, only photons polarised along the slow axis of the 90° input fibre are reflected by the beam combiner 136 and pass into the output port, while those polarised along the fast axis will be transmitted out of the beam combiner 136 and lost.

This means that the slow axis of one of the two input fibres is rotated by 90° relative to the output port. Alternatively the polarisation may be rotated using a polarisation rotator (not shown) before one of the input ports of the polarising beam combiner (136).

Thus, photon pulses which passed through the long 132 and short arms 131 will have orthogonal polarisations.

The signal pulses are then strongly attenuated by the attenuator 137 so that the average number of photons per signal pulse $\mu \ll 1$.

The signal pulses which are outputted by the combiner 136 into single mode fibre 138 are then multiplexed with a bright laser clock source 102 at a different wavelength using a WDM coupler 139. The multiplexed signal is then transmitted to the receiver Bob 103 along an optical fibre link 105. The biasing electronics 109 synchronises the output of the clock source 102 with the signal pulse.

Bob's equipment 103 comprises WDM coupler 141, a clock recovery unit 142 connected to an output of coupler 141, a polarisation controller 144 connected to the other output of WDM coupler 141, an imbalanced Mach-Zender interferometer 156 connected to the output of polarisation controller 144, two single photon detectors A 161, B 163 connected to the output arms of interferometer 156 and biasing electronics 143 connected to the detectors 161, 163. Bob's interferometer 156 contains an entrance polarising beam splitter 151 connected to both: a long arm 153 containing a delay loop 154 and a variable delay line 157; and a short arm 152 containing a phase modulator 155. The long arm 153 and short arm 152 are connected to an exit polarisation maintaining 50/50 fibre coupler 158. All components in Bob's interferometer 156 are polarisation maintaining.

Bob first de-multiplexes the transmitted signal received from Alice 101 via fibre 105 using the WDM coupler 141. The bright clock laser 102 signal is routed to an optical receiver 142 to recover the clock signal for Bob 103 to synchronise with Alice 101.

The signal pulses which are separated from the clock pulses by WDM coupler 141 are fed into a polarisation controller 144 to restore the original polarisation of the signal pulses. This is done so that signal pulses which travelled the short arm 131 in Alice's interferometer 133, will pass the long arm 153 in Bob's interferometer 156. Similarly, signal pulses which travelled through the long arm 132 of Alice's interferometer 133 will travel through the short arm 152 of Bob's interferometer.

The signal then passes through Bob's interferometer 156. An entrance polarising beam splitter 151 divides the incident pulses with orthogonal linear polarisations. The two outputs of the entrance polarisation beam splitter 151 are aligned such that the two output polarisations are both coupled into a particular axis, usually the slow axis, of the polarisation maintaining fibre. This ensures that signal pulses taking either arm will have the same polarisation at the exit 50/50 polarisation maintaining coupler 158. The long arm 153 of Bob's interferometer 156 contains an optical fibre delay loop 154 and a variable fibre delay line 157, and the short arm 152 contains a phase modulator 155. The two arms 152, 153 are connected to a 50/50 polarisation maintaining fibre coupler 158 with a single photon detector A 161, B 163 attached to each output arm. Due to the use of polarising components, there are, in ideal cases, only two routes for a signal pulse travelling from the entrance of Alice's interferometer to the exit of Bob's interferometer:

i. Alice's Long Arm 132–Bob's Short Arm 152 (L-S) and
ii. Alice's Short Arm 131–Bob's Long Arm 153 (S-L).

The variable delay line 157 at Bob's interferometer 156 is adjusted to make the propagation time along routes (i) and (ii) almost equal, within the signal laser coherence time which is typically a few picoseconds for a semiconductor distributed feed back (DFB) laser diode, and thereby ensure interference of the two paths. Bob achieves this by adjusting the variable fibre delay line 157 prior to key transfer.

FIG. 1b is a plot of probability of a photon arriving at either of detectors A 161, B 163 against time. The early satellite signal peak shown in FIG. 1b is due to photons travelling through Alice's short arm 131 to Bob's short arm 152, and the late satellite signal peak is due to those travelling through Alice's long arm 132 to Bob's long arm 153. Photons taking these non-ideal routes are due to incomplete polarisation control by the polarisation controller 144, and they reduce quantum key distribution rate. So, Bob has to adjust the polarisation controller 144 prior to key distribution to minimise the strength of the satellite signal pulses in FIG. 1b.

By controlling the voltages applied to their phase modulators 134, 155, Alice and Bob determine in tandem whether paths (i) and (ii) undergo constructive or destructive interference at detectors A 161 and B 163. The phase modulators 134, 155 are connected to respective biasing means 109 and 143 to ensure synchronisation.

The variable delay line 157 can be set such that there is constructive interference at detector A 161 (and thus destructive interference at detector B 163) for zero phase difference between Alice and Bob's phase modulators. Thus for zero phase difference between Alice's and Bob's modulators and for a perfect interferometer with 100% visibility, there will be a negligible count rate at detector B 163 and a finite count rate at A 161.

If, on the other hand, the phase difference between Alice and Bob's modulators 134, 155 is 180°, there should be destructive interference at detector A 161 (and thus negligible count rate) and constructive at detector B 163. For any other phase difference between their two modulators, there will be a finite probability that a photon may output at detector A 161 or detector B 163.

In the four-state protocol, which is sometimes referred to as BB84, Alice sets the voltage on her phase modulator to one of four different values, corresponding to phase shifts of 0°, 90°, 180°, and 270°. Phase 0° and 180° are associated with bits 0 and 1 in a first encoding basis, while 90° and 270° are associated with 0 and 1 in a second encoding basis. The second encoding basis is chosen to be non-orthogonal to the first. The phase shift is chosen at random for each signal pulse and Alice records the phase shift applied for each clock cycle.

Meanwhile Bob randomly varies the voltage applied to his phase modulator between two values corresponding to 0° and 90°. This amounts to selecting between the first and second measurement bases, respectively. Bob records the phase shift applied and the measurement result (i.e photon at detector A 161, photon at detector B 163, photon at detector A 161 and detector B 163, or no photon detected) for each clock cycle.

In the BB84 protocol, Alice and Bob can form a shared key by communicating on a classical channel after Bob's measurements have taken place. Bob tells Alice in which clock cycles he measured a photon and which measurement basis he used, but not the result of the measurement. Alice then tells Bob the clock cycles in which she used the same encoding basis and they agree to keep only those results, as in this case Bob will have made deterministic measurements upon the encoded photons. This is followed by error correction, to remove any errors in their shared key, and privacy amplification to exclude any information known to an eavesdropper.

The system in FIG. 1a is also suitable for implementing the two-state protocol known as B92. In this case only one detector is needed on one output arm of Bob's interferometer 156. The arm lengths are calibrated so that for zero phase delay the photon rate into the detector is maximum (constructive interference). For the B92 protocol Alice applies phase shifts of 0 and 90° on her phase modulator randomly. Alice associates 0 phase delay with bit=0, and 90° phase delay with bit=1. Bob applies 180" or 270° to his phase modulator randomly, and associates 180° with bit=1 and 270° with bit=0. After Bob's detections, he tells Alice in which clock cycle he detected a photon and they keep these bits to form a shared sifted key. They then perform error correction and privacy amplification upon the sifted key.

Figure 2:
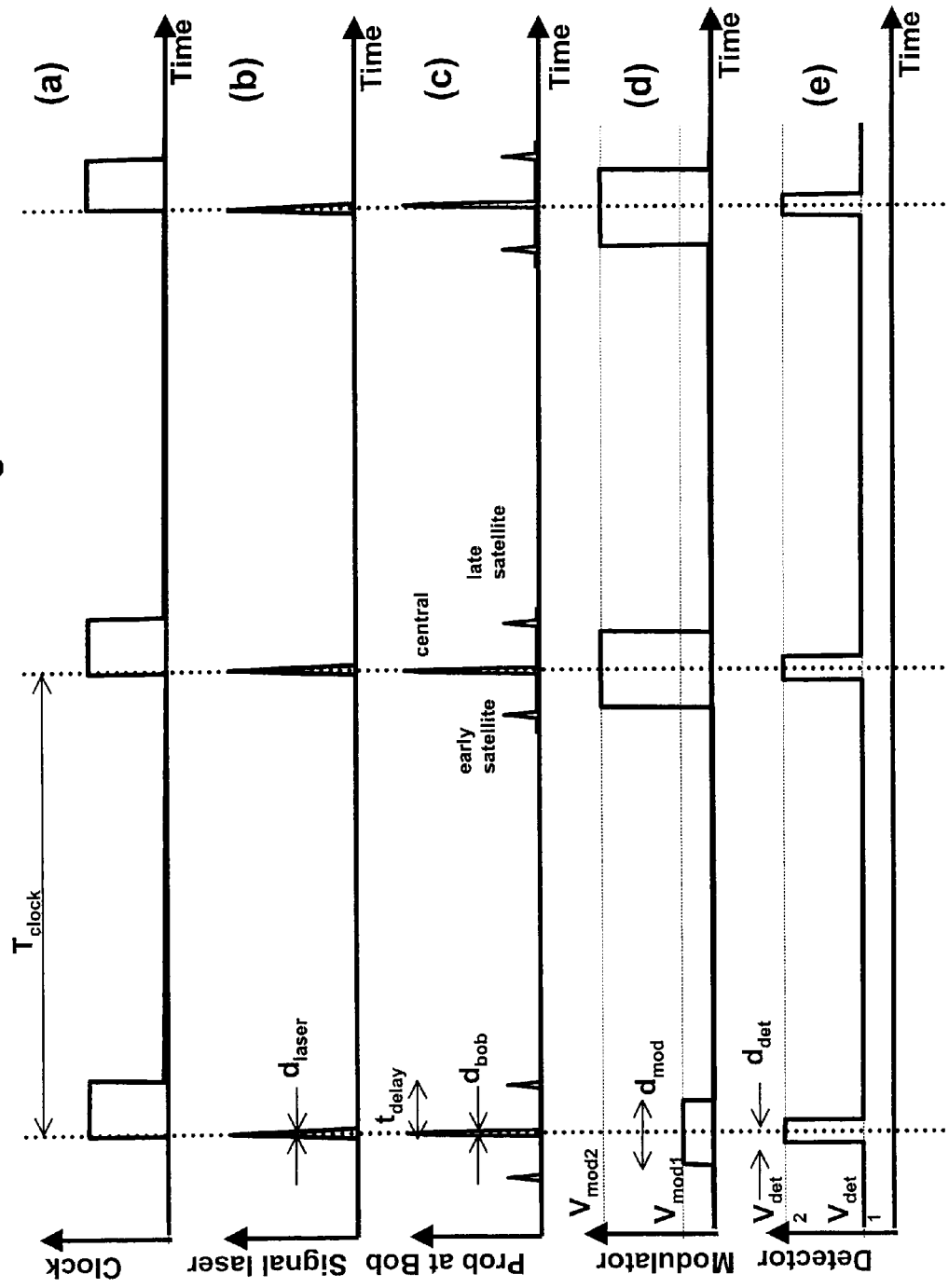

Paragraph moved to introduction FIG. 2 shows plots of the timing schemes which may be used for the prior art quantum cryptographic system of FIG. 1a.

FIG. 2a shows the clock signal produced by the biasing electronics 109 as a function of time. The clock has a repetition period $T_{clock}$. The rising edge of the clock signal is used to synchronise Alice's signal laser 107, Alice's phase modulator 134, Bob's phase modulator 155 and Bob's detectors A 161 and B 163.

The output of the signal laser 107 is shown in FIG. 2b. For each clock period, the signal laser 107 is triggered to produce one pulse of width $d_{laser}$.

FIG. 2c plots the probability of a photon arriving at Bob's detectors A 161 and B 163 (i.e. sum of the probabilities of a photon arriving at detector A or detector B) as a function of time. Each signal pulse now has a width of $d_{bob}$, which may be greater than $d_{laser}$ due to dispersion in the fibres of the system. Three arrival windows can be seen for each clock cycle. In order of arrival time, these correspond to photons taking the short-short, long-short or short-long and long-long paths through Alice's-Bob's interferometer as described with reference to FIG. 1b. Thus the first and second, as well as the second and third pulses are separated by a time delay $t_{delay}$. The short-short and long-long paths are due to imperfect polarisation beam splitting at the entrance 151 of Bob's interferometer 156.

Only photons arriving in the central window of each clock cycle undergo interference and are thus of interest. The single photon detectors A 161 and B 163 are gated to be on only when the central pulse arrives in each clock cycle, as shown in FIG. 2e. This is achieved by biasing the detector with a voltage $V_{det2}$ for which it is in an active state for a short duration $d_{det}$ during each clock cycle when the central pulse arrives. The bias voltage duration $d_{det}$ is typically chosen to be longer than $d_{bob}$ and is typically a few nanoseconds. At other times the detector is held at a voltage $V_{det1}$ for which it is inactive.

For a single photon detector based upon an avalanche photodiode, time gating can be achieved by choosing $V_{det2}$ to be greater than the avalanche breakdown voltage of the diode and $V_{det1}$ to be less than the breakdown voltage. An avalanche can only be triggered when the diode bias exceeds the breakdown threshold.

The avalanche process generates a large number of charge carriers within the diode forming an easily detectable current. Some of these carriers may be localised at hetero-junctions or at trap states within the semiconductor. Carriers confined in such traps can have a lifetime of several microseconds. If the diode is biased above the avalanche breakdown threshold, before the trapped carriers have decayed, there is a possibility that a trapped carrier could be released and then trigger another avalanche. The resultant spurious signal is called an 'afterpulse'.

To minimise the rate of afterpulse counts, the APD is biased inactive for a sufficiently long time to allow most of the trapped charge to decay. Thus in a conventional quantum cryptography system, afterpulsing limits the minimum period between APD detection gates and thus the minimum clock period $T_{clock}$. Typically $T_{clock}$~1 µs.

Alice's and Bob's phase modulators 134 and 155 are driven by separate voltage pulse generators. The voltage pulse generators are also synchronised with the clock signal (of FIG. 2a), as shown in FIG. 2d.

Figure 3:
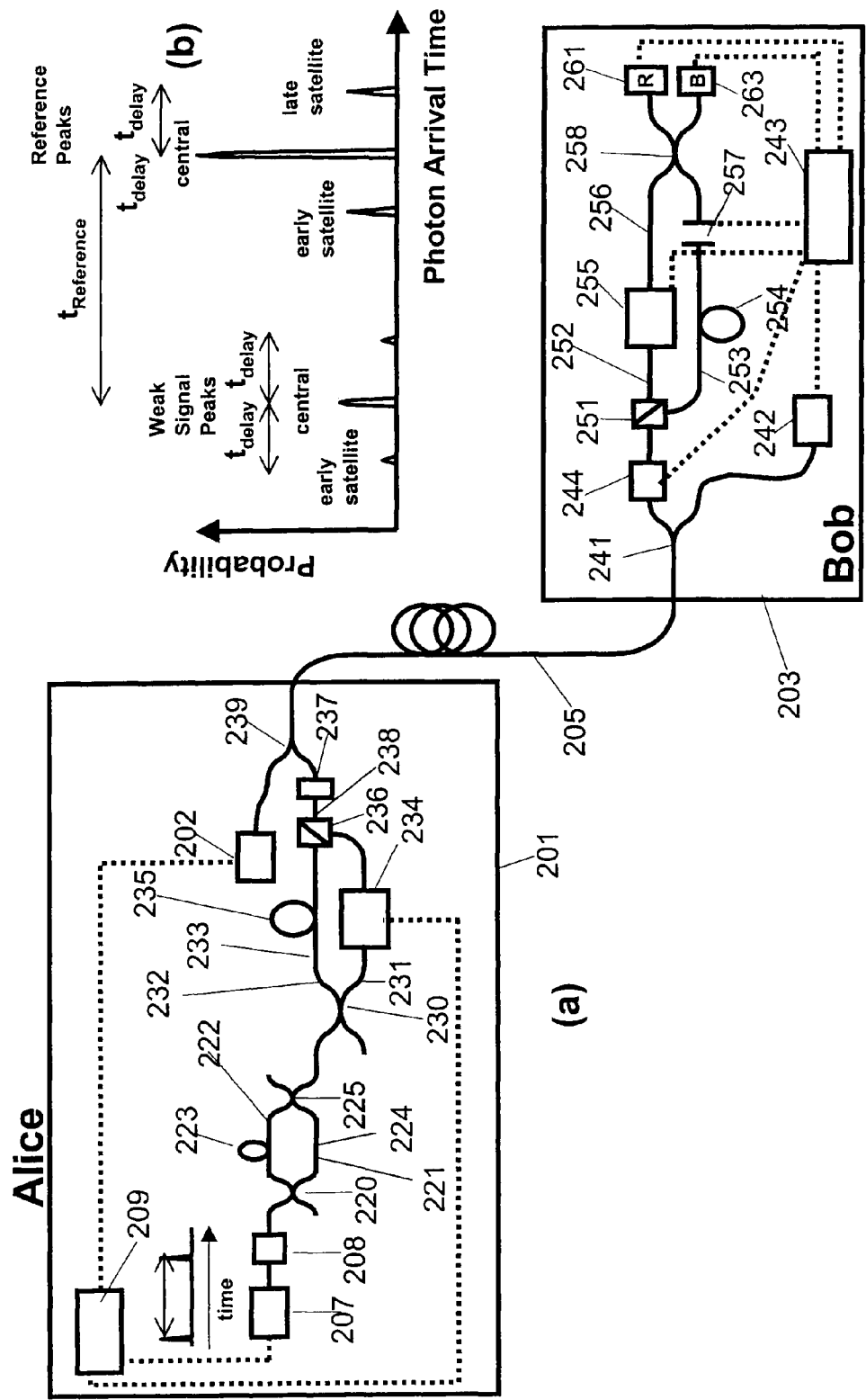
FIG. 3a is a communication system in accordance with the preferred embodiment of the present invention and FIG. 3b is a plot of the probability of a photon arriving at either of the detectors in the system of FIG. 3a against time.

During the pass of each signal pulse through the phase modulator, the pulse generator outputs one of a number of voltage levels, $V_{mod1}$, $V_{mod2}$ etc. For the BB84 protocol, for instance, Alice applied one of four different voltage levels, corresponding to phase shifts of 0°, 90°, 180°, and 270°. Meanwhile Bob applies two voltage levels to his modulator corresponding to phase shifts of 0° and 90°. Alice and Bob vary the applied phase shifts for each signal pulse randomly and independently of one-another. FIG. 3a shows an apparatus for quantum cryptography with active stabilisation.

Alice and Bob's equipment is similar to that described with reference to FIG. 1a. As described with reference to FIG. 1a, Alice 201 sends photons to Bob 203 along fibre 205.

Alice's equipment 201 comprises a signal laser diode 207, a polarisation rotator 208 connected to the output of said signal laser diode 207, a signal/reference pulse separator 224 connected to the output of said polarisation rotator 208, an imbalanced fibre Mach-Zender interferometer 233 for encoding photons connected to the output of the signal/reference pulse separator 224, an attenuator 237 connected to the output of the interferometer 233, a bright clock laser 202, a wavelength division multiplexing (WDM) coupler 239 connected to both the output of the attenuator 237 and the bright clock laser 202 and bias electronics 209. The biasing electronics 209 are connected to both the clock laser 202 and the signal laser 207.

The signal/reference pulse separator 224 comprises an entrance fibre optic coupler 220 with a first output connected to a long arm 222 with a loop of fibre 223 designed to cause an optical delay and short arm 221. The separator 224 further comprises an exit fibre optic coupler 225 combining two arms 221 and 222. All fibre in separator 224 is polarisation maintaining.

The encoding interferometer 233 is identical to that described in FIG. 1a and comprises an entrance coupler 230, a long arm 232 with a loop of fibre 235 designed to cause an optical delay, a short arm 231 with a phase modulator 234, and an exit polarising beam combiner 236. All components used in Alice's interferometer 233 are polarisation maintaining.

During each clock signal, the signal laser diode laser 207 outputs one optical pulse under the control of biasing electronics 209.

The polarisation of the signal pulses is rotated by a polarisation rotator 208 so that the polarisation is aligned to be parallel to a particular axis of the polarisation maintaining fibre, usually the slow axis, of the entrance coupler 220 of separator 224. Alternatively the polarisation rotator 208 may be omitted by rotating the signal laser diode 207 with respect to the axes of the entrance coupler 220 of separator 224.

The signal pulses are then fed into the signal/reference pulse separator 224 through polarisation maintaining fibre coupler 220. Signal pulses are coupled into the same axis, usually the slow axis of the polarisation maintaining fibre, from both output arms of the polarisation maintaining fibre coupler 220.

The long arm 222 of the signal/reference pulse separator 224 contains an optical fibre delay loop 223. The length difference of the two arms 221 and 222 corresponds to an optical propagation delay of $t_{reference}$. Typically the length of the delay loop 223 may be chosen to produce a delay $t_{reference}$~10 ns. A photon travelling through the long arm 222 will lag that travelling through the short arm 221 by a time of $t_{reference}$ at the exit coupler 225 of the splitter 224.

The two arms 221 and 222 are combined together with an exit polarisation maintaining fibre optic coupler 225. One output is connected into one input of the encoding Mach-Zender interferometer 233.

Coupling ratio of two couplers 220 and 225 can be either fixed or variable. The ratios are chosen so that the reference and signal pulses have unequal intensities. Typically, before entering the encoding interferometer 233, the later reference pulse is 10-10000 times stronger than the earlier signal pulse. For example, the entrance coupler 220 may be asymmetric so as to allow 90% to 99.99% of the input into arm 221 and the exit coupler 225 may be a 50/50 coupler. Alternatively, both the entrance 220 and exit couplers 225 may be 50/50 couplers and an appropriate attenuator placed in arm 221.

Properties of the signal and reference pulses are exactly the same, for example polarisation, wavelength etc, except of course for their intensity and time of injection into the interferometer 233.

The signal and reference pulses are then fed into the imbalanced Mach-Zender interferometer 233 through a polarisation maintaining fibre coupler 230. Signal and reference pulses are coupled into the same axis, usually the slow axis of the polarisation maintaining fibre, from both output arms of the polarisation maintaining fibre coupler 230.

The long arm 232 of the interferometer 233 contains an optical fibre delay loop 235, while the short arm 231 contains a fibre optic phase modulator 234. The length difference of the two arms 231 and 232 corresponds to an optical propagation delay of $t_{delay}$. Typically the length of the delay loop 235 may be chosen to produce a delay $t_{delay} \sim 5$ ns. A photon travelling through the long arm 232 will lag that travelling through the short arm 231 by a time of $t_{delay}$ at the exit 236 of the interferometer 233.

The two arms 231, 232 are combined together with a polarisation beam combiner 236 into a single mode fibre 238. The fibre inputs of the polarisation beam combiner 236 are aligned in such a way that only photons propagating along particular axes of the polarisation maintaining fibre are output from the combiner 236. Typically, photons which propagate along the slow axis or the fast axis are output by combiner 236 into single mode fibre 238.

The polarising beam combiner 236 has two input ports, an in-line input port and a 90° input port. One of the input ports is connected to the long arm 232 of the interferometer 233 and the other input port is connected to the short arm 231 of the interferometer 233.

Only photons polarised along the slow axis of the in-line input fibre of the in-line input port are transmitted by the polarising beam combiner 236 and pass into the fibre 238. Photons polarised along the fast axis of the in-line input fibre of the input port are reflected and lost.

Meanwhile, at the 90° input port of the beam coupler 236, only photons polarised along the slow axis of the 90° input fibre are reflected by the beam combiner 236 and pass into the output port, while those polarised along the fast axis will be transmitted out of the beam combiner 236 and lost.

This means that the slow axis of one of the two input fibres is rotated by 90° relative to the output port. Alternatively the polarisation may be rotated using a polarisation rotator before one of the input ports of the polarising beam combiner.

Thus, photon pulses which passed through the long 232 and short arms 231 will have orthogonal polarisations.

Both the signal and reference pulses are then strongly attenuated by the attenuator 237 so that the average number of photons per pulse $\mu \ll 1$ for the signal pulses. The reference pulses are typically 10-1000 stronger than the signal pulses, and do not have to be attenuated to single photon level as information is only encoded upon signal pulses.

The attenuated pulses are then multiplexed with a bright laser clock source 202 at a different wavelength using a WDM coupler 239. The multiplexed signal is then transmitted to the receiver Bob 203 along an optical fibre link 205.

The clock may also be delivered in other ways. For example Alice may multiplex the signal pulses with a bright clock laser pulse at the same or different wavelength which is delayed relative to the start of the clock cycle and which does not coincide with the signal pulses. Alternatively the clock signal may be sent on a separate optical fibre. Alternatively, synchronisation may be achieved by using a timing reference.

Bob's equipment 203 comprises WDM coupler 241, a clock recovery unit 242 connected to one output of said WDM coupler 241, a polarisation controller 244 connected to the other output of said WDM coupler 241, an imbalanced Mach-Zender interferometer 256 connected to the output of polarisation controller 244, two single photon detectors R 261, B 263 connected to the two outputs of interferometer 256 and biasing electronics 243.

Bob's interferometer 256 contains an entrance polarising beam splitter 251, a long arm 253 containing a delay loop 254 and a variable delay line 257 is connected to an output of beam splitter 251, a short arm 252 containing a phase modulator 255 is connected to the other output of said beam splitter 251, and an exit polarisation maintaining 50/50 fibre coupler 258 coupling the output from the long 253 and short 252 arms. All components in Bob's interferometer 256 are polarisation maintaining.

Bob first de-multiplexes the transmitted signal received from fibre 205 using the WDM coupler 241. The bright clock laser 202 signal is routed to an optical receiver 242 to recover the clock signal for Bob to synchronise with Alice.

If Alice delivers the clock using an alternative method, Bob will recover the clock accordingly. If Alice sends the clock signal as a single bright pulse within each clock cycle which is delayed relative to signal pulses then Bob may use an imbalanced coupler, such as 90/10, to extract a fraction of the combined signal which is measured with a photo-diode. A clock pulse is then recovered if the incident intensity is above an appropriately set threshold. Alternatively Bob may detect the clock on a separate fibre or using a timing reference.

The signal pulses which are separated from the clock pulses by WDM coupler 241 are fed into a polarisation controller 244 to restore the original polarisation of the signal pulses. This is done so that signal pulses which travelled the short arm 231 in Alice's interferometer 233, will pass the long arm 253 in Bob's interferometer 256. Similarly, signal pulses which travelled through the long arm 232 of Alice's interferometer 233 will travel through the short arm 252 of Bob's interferometer 256.

The signal/reference pulses from signal laser 207 then pass through Bob's interferometer 256. An entrance polarising beam splitter 251 divides the incident pulses with orthogonal linear polarisations. The two outputs of the entrance polarisation beam splitter 251 are aligned such that the two output polarisations are both coupled into a particular axis, usually the slow axis, of the polarisation maintaining fibre. This ensures that signal pulses taking either arm will have the same polarisation at the exit 50/50 polarisation maintaining coupler 258. The long arm 253 of Bob's interferometer 256 contains an optical fibre delay loop 254 and a variable fibre delay line 257, and the short arm 252 contains a phase modulator 255. The two arms 252, 253 are connected to a 50/50 polarisation maintaining fibre coupler 258 with a single photon detector R 261, B 263 attached to each output arm.

Due to the use of polarising components, there are, in ideal cases, only two routes for a signal pulse travelling from the entrance of Alice's encoding interferometer 233 to the exit of Bob's interferometer 256:

i. Alice's Long Arm 232–Bob's Short Arm 252 (L-S) and
ii. Alice's Short Arm 231–Bob's Long Arm 253 (S-L).

The variable delay line 257 at Bob's interferometer 256 is adjusted to make the propagation time along routes (i) and (ii) almost equal, within the signal laser coherence time which is typically a few picoseconds for a semiconductor distributed feed back (DFB) laser diode, and thereby ensure interference of the two paths.

The variable fiber delay line 257 can either be an airgap, or a fibre stretcher, driven by a piezo-electric actuator. Alternatively, the two delays can be balanced by carefully controlling the length of fibre in Alice's 233 and Bob's 256 interferometers. Fine adjustment of the length of the two optical paths can be achieved through the calibration of zero phase delay in the two modulators 234, 255.

It is important that the central arrival time window of the signal pulses at single photon detectors do not overlap temporally with any arrival windows of the reference pulses. Otherwise, interference visibility will decrease. This can be guaranteed by carefully choosing the lengths of the delay loops 223, 235 to ensure $t_{delay} < t_{reference}$.

The references pulses are used to actively monitor and stabilise the phase drift of Alice-Bob's encoding interferometer. The detector R can be a single photon detector. It is gated to be on only upon the central arrival time of the reference peak and measure the count rate. If the system were perfectly stable, the counting rate is constant. Any variation in phase drift will be manifested by a varying counting rate. Bob uses any variation in the count rate measured by the reference detector R 261 as a feedback signal to the variable delay line 257. Thus the optical delay is adjusted to stabilise the counting rate in the reference detector, and compensate any phase drifts of Alice or Bob's interferometers.

Bob can avoid using the delay line 257. The count rate measured by the reference detector R261 can be used a feedback signal to the phase modulator. The DC-bias applied to the phase modulator is then varied to stabilising the counting rate, and compensate any phase drifts of Alice or Bob's interferometers.

It is most convenient to maintain the reference detector with a minimum count rate. In this case, destructive interference is maintained at the reference detector R 261.

The reference detector R 261 and associated electronics should integrate the count rate over a certain period of time in order to average statistical fluctuation in the arrival rate of the reference photons. The integration time may typically be a fraction of a second, for example, 0.1 second. Such feedback times are sufficient since the phase drift of the Alice and Bob's interferometers occurs over much longer time scales. For highly unstable environment, much shorter feedback times, for example, 0.1 ms, may be employed. Alternatively, the feedback signal may be used to recalibrate the zero point of both phase modulators as described above. This may be done by varying the DC bias applied to modulators 255 and 234.

The feedback electronics may also condition system for sudden shocks to the system, such as a sudden change in temperature. If a sudden change in count rate is detected in the reference detector R 261, the results in the signal detector B 263 can be ignored until the system regains stability.

The references pulses are also used to actively monitor and stabilise the polarisation drift of photons. The two satellites peaks of the reference peak in FIG. 3b are due to imperfect polarisation control by the controller 244 and therefore imperfect polarisation beam splitting of the entrance polarisation beam splitter 251 of Bob's interferometer 256. The early satellite peak arises from the short arm 231 of Alice's encoding interferometer 233 to Bob's Short Arm 252, and the late satellite peak arises from the long arm 232 of Alice's encoding interferometer 233 to Bob's long arm 253. By gating the reference detector R 261 to detect during the arrival of one of the satellite peaks and measure the photon counting rate, Bob can monitor the drift in the polarisation of the photons and actively stabilise it by feeding the measurement result back into the polarisation controller 244. The polarisation controller 244 rotates the polarisation of photons so as to minimise the count rate of the satellite peak of the reference pulse in the reference detector R 261.

The reference detector R 261 should integrate photon counts over a certain period of time in order to reduce statistical fluctuation. The integration time can again be as short as a fraction of a second, for example, 0.1 second. This is typically much faster than the time scale over which the polarisation drifts. Much shorter integration time can be chosen for system operates in unstable conditions.

The system in FIG. 3a is suitable for implementing the two-state protocol known as B92. In this case only one detector is needed on one output arm of Bob's interferometer 256 for detecting encoded single photons. As the arm lengths are stabilised so that for zero phase delay the photon rate into the detector R 261 is minimum, and the photon rate into the detector B 263 is maximum.

For the B92 protocol Alice applies phase shifts of either 0 or 90° on her phase modulator 234 to the signal pulses. Alice associates 0 phase delay with bit=0, and 90° phase delay with bit=1. Bob applies either 180° or 270° to his phase modulator 255, and associates 180° with bit=1 and 270° with bit=0. After Bob's detections, he tells Alice in which clock cycle he detected a photon and they keep these bits to form a shared sifted key. They then perform error correction and privacy amplification upon the sifted key.

It is most important that Alice and Bob apply the modulation to the signal pulses only and not the reference pulses during the time the reference pulses passes their phase modulators, should be set to 0° or some other fixed value. This is to ensure that the reference pulses do not carry any encoded information and therefore an eavesdropper cannot gain any information from measuring the reference pulses. At the same time, interferences of these pulses are not affected by Alice and Bob's information encoding processes.

Figure 4:
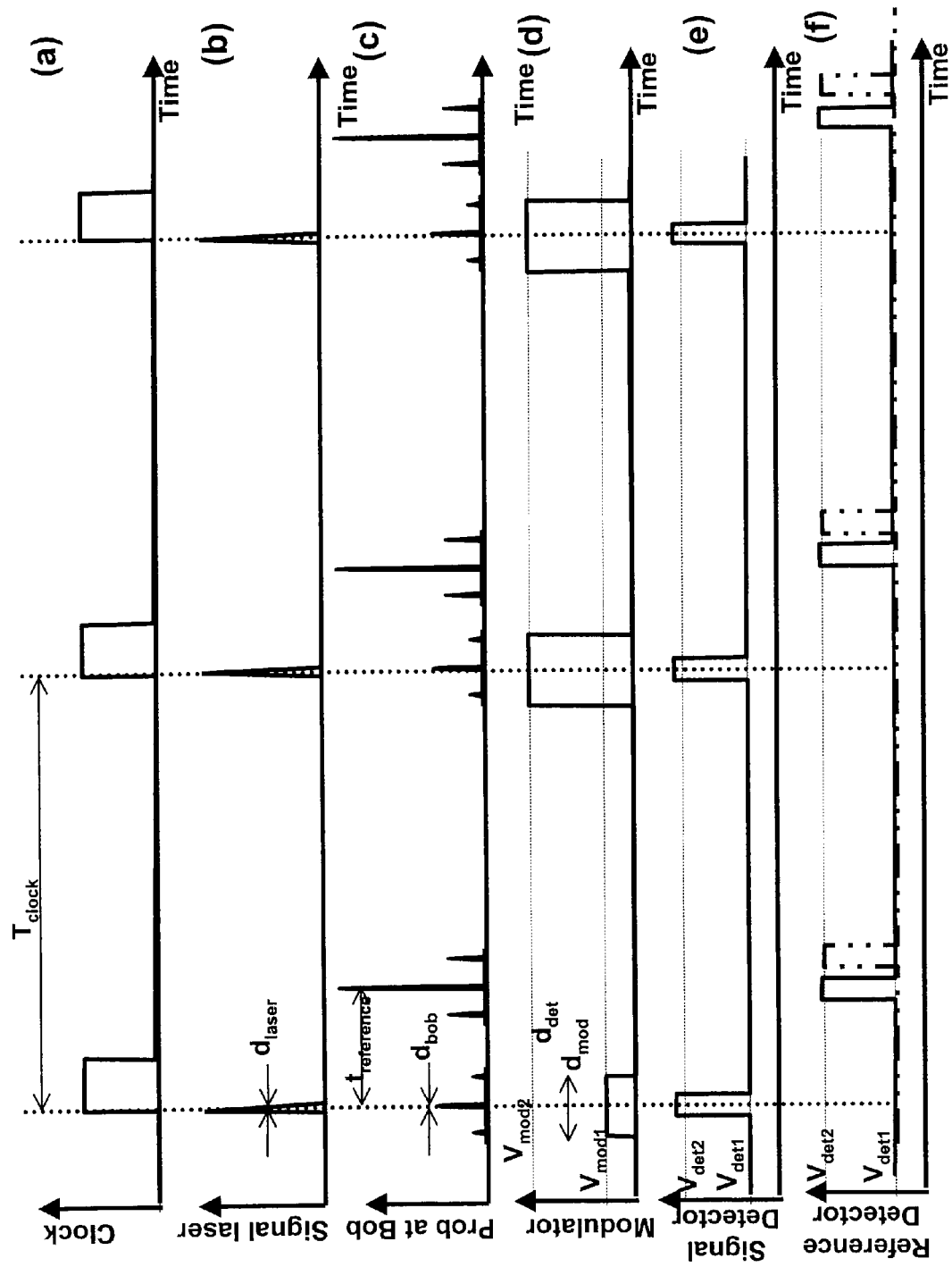

FIG. 4 shows plots of the timing schemes which may be used for the quantum cryptographic system of FIG. 3a.

FIG. 4a shows the clock signal produced by the clock laser 202 as a function of time. The clock has a repetition period $T_{clock}$. The rising edge of the clock signal is used to synchronise Alice's signal laser 207, Alice's phase modulator 234, Bob's phase modulator 255 and Bob's detectors R 261 and B 263.

The output of the signal laser 207 is shown in FIG. 4b. For each clock period, the signal laser 207 is triggered to produce one pulse of width $d_{laser}$.

FIG. 4c plots the probability of a photon arriving at Bob's detectors R 261 and A 263 (i.e. sum of the probabilities of a photon arriving at detector R 261 or detector B 263) as a function of time. Each signal/reference pulse now has a width of $d_{bob}$, which may be greater than $d_{laser}$ due to dispersion in the fibre. Six arrival windows can be seen for each clock cycle. These correspond to signal or reference pulses taking the short-short, long-short or short-long and long-long paths through Alice's-Bob's interferometer. The first and second, as well as the second and third signal pulses are separated by a time delay $t_{delay}$, and the first and second, as well as the second and third reference (strong) signal pulses are also separated by a time delay $t_{delay}$. The central signal peak and central reference peak are separated by a time delay of $t_{reference}$. The short-short and long-long paths are observed due to imperfect polarisation beam splitting at the entrance 251 of Bob's interferometer 256.

Only photons arriving in the central window of the signal pulses of each clock cycle contribute to quantum key distribution. The single photon detector B 263 is gated to be on only when the central pulse arrives in each clock cycle, as shown in FIG. 4e. This is achieved by biasing the detector with a voltage $V_{det2}$ for which it is in an active state for a short duration $d_{det}$ during each clock cycle when the central pulse arrives. The bias voltage duration $d_{det}$ is typically chosen to be longer than $d_{bob}$ and is typically a few nanoseconds. At other times the detector is held at a voltage $V_{det1}$ for which it is inactive.

For a single photon detector based upon an avalanche photodiode, time gating can be achieved by choosing $V_{det2}$ to be greater than the avalanche breakdown voltage of the diode and $V_{det1}$ to be less than the breakdown voltage. An avalanche can only be triggered when the diode bias exceeds the breakdown threshold.

The avalanche process generates a large number of charge carriers within the diode forming an easily detectable current. Some of these carriers may be localised at hetero-junctions or at trap states within the semiconductor. Carriers confined in such traps can have a lifetime of several microseconds. If the diode is biased above the avalanche breakdown threshold, before the trapped carriers have decayed, there is a possibility that a trapped carrier could be released and then trigger another avalanche. The resultant spurious signal is called an 'afterpulse'.

To minimise the rate of afterpulse counts, the APD has to be biased inactive for a sufficiently long time to allow most of the trapped charge to decay. Thus afterpulsing often limits the minimum period between APD detection gates and thus the minimum clock period $T_{clock}$. Typically $T_{clock} \sim 1$ μs.

Alice's and Bob's phase modulators 234 and 255 are driven by separate voltage pulse generators. The voltage pulse generators are also synchronised with the clock signal (of FIG. 4a), as shown in FIG. 4d.

During the pass of each signal pulse through the phase modulator, the pulse generator outputs one of a number of voltage levels, $V_{mod1}$, $V_{mod2}$ etc. For the B92 protocol, for instance, Alice applied one of two different voltage levels, corresponding to phase shifts of 0° and 90°, to her phase modulator 234. Meanwhile Bob applies two voltage levels to his modulator 255 corresponding to phase shifts of 180° and 270°. Alice and Bob vary the applied phase shifts for each signal pulse randomly and independently of one-another.

It is important that Alice and Bob only modulate only the signal pulses, but not the reference pulses. The phase modulator should be set to zero or some other fixed value during the time that the reference pulse passes.

If the modulators are also used to compensate for phase drift, the DC bias applied to the modulators shown in FIG. 4d may be slightly above or below the levels shown in FIG. 4d. The variation from the DC bias illustrated in FIG. 4d will be controlled by the feedback from the measurements of the reference pulse.

FIG. 4f shows the bias scheme for the reference detector R 261. To monitor and stabilise the phase drift, the detector is gated to be on only upon the central arrival window of the reference signal pulses to detect photons taking Long-Short or Short-Long route through Alice-Bob's encoding interferometer.

This is achieved by biasing the detector with a voltage $V_{det2}$ for which it is in an active state for a short duration $d_{det1}$ during each clock cycle when the central reference pulse arrives, as shown by the solid line in FIG. 4f. The bias voltage duration $d_{det}$ is typically chosen to be longer than $d_{bob}$ and is typically a few nanoseconds. At other times the detector is held at a voltage $V_{det1}$ for which it is inactive.

To monitor and stabilise the polarisation, the reference detector R is gated to be on only upon one of the satellite arrival window of the reference signal pulses to detect photons. This is shown by the dash-dotted line in FIG. 4f. The reference detector may alternate between measurement of the central and the satellite peak. Measurements of the central reference peaks are averaged and feedback to stabilise the phase of the interferometer as described above. Measurements of the satellite peak are averaged and feedback to stabilise the polarisation input to Bob's interferometer as described above.

FIG. 4f shows the case where one reference measurement is made per clock cycle. However, it is also possible to sample the reference pulse less frequently or to supply more than one reference pulse per clock cycle.

Figure 5:
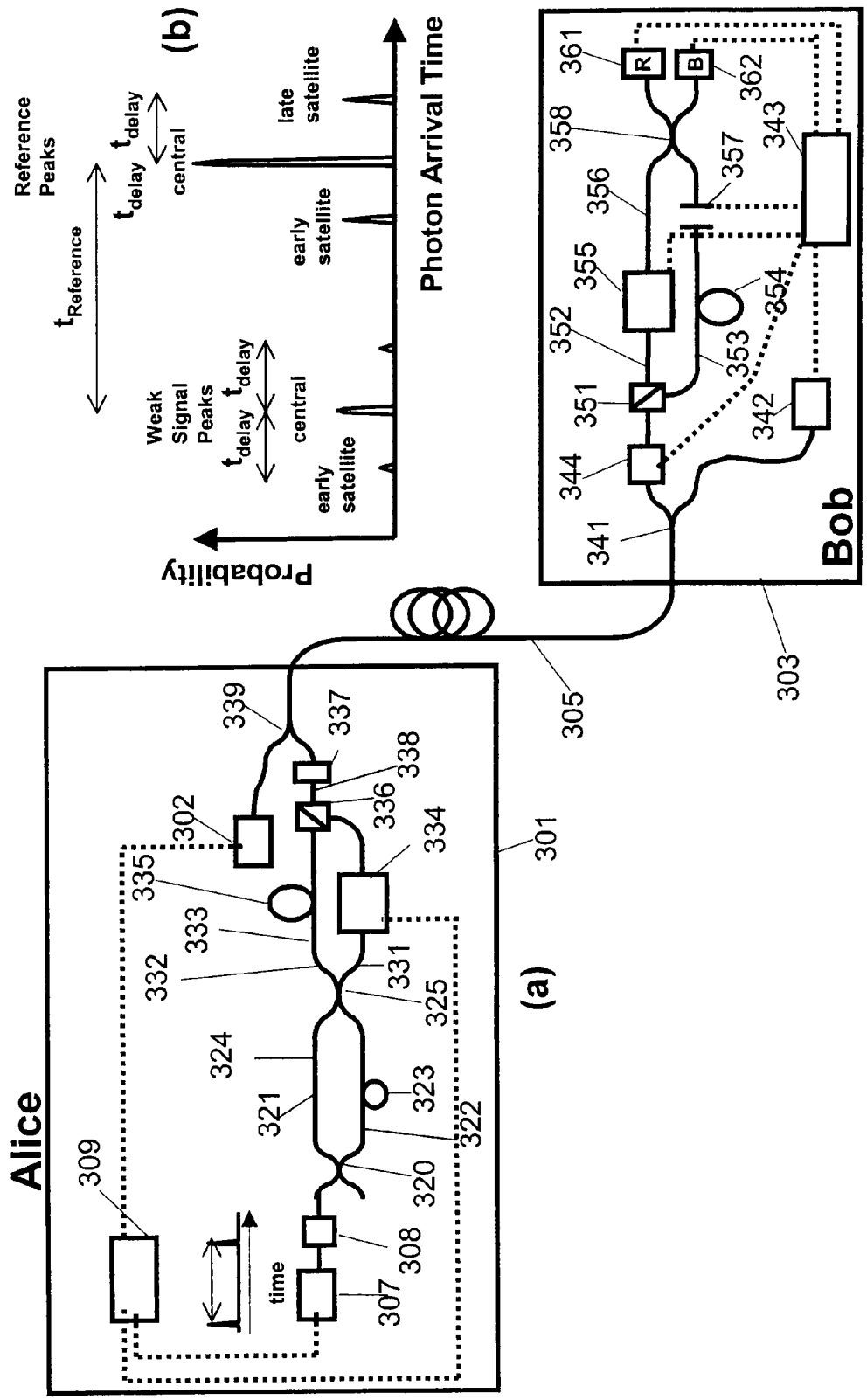
FIG. 5a is a quantum communication system in accordance with a preferred embodiment of the present invention where the exit member of the separator provides the entrance member for the interferometer and FIG. 5b is a plot of the probability of a photon arriving at either of the detectors of the system of FIG. 5a against time.

FIG. 5a shows an apparatus for quantum cryptography with active monitoring and stabilisation on phase and polarisation drifts.

Alice and Bob's equipment is similar to that described with reference to FIG. 3a. Alice 301 sends photons to Bob 303 along fibre 305.

Alice's equipment 301 comprises a signal laser diode 307, a polarisation rotator 308 receiving output of laser diode 307, a signal/reference pulse separator 324 receiving the output of polarisation rotator 308, an imbalanced fibre Mach-Zender interferometer 333 for encoding photons receiving the output from separator 324, an attenuator 337 connected to the output of interferometer 333, a bright clock laser 302, a wavelength division multiplexing (WDM) coupler 339 and bias electronics 309.

The signal/reference pulse separator 324 consists of an entrance fibre optic coupler 320, a long arm 322 with a loop of fibre 323 designed to cause an optical delay connected to one output of entrance coupler 320, a short arm 321 connected to the other output of entrance coupler 320, and an exit fibre optic coupler 325 combining two arms 321, 322. All fibres in the separator 324 are polarisation maintaining.

The interferometer 333 shares its entrance coupler 325 with the signal/reference pulse separator 324, and consists of a long arm 332 with a loop of fibre 335 designed to cause an optical delay, a short arm 331 with a phase modulator 334, and an exit polarising beam combiner 336. All components used in Alice's interferometer 333 are polarisation maintaining.

During each clock signal, the signal laser diode laser 307 outputs one optical pulse.

The polarisation of the signal pulses is rotated by a polarisation rotator 308 so that the polarisation is aligned to be parallel to a particular axis of the polarisation maintaining fibre, usually the slow axis, of the entrance coupler of the signal/reference pulse separator 324. Alternatively the polarisation rotator 308 may be omitted by rotating the signal laser diode 307 with respect to the axes of the entrance polarisation maintaining fibre coupler 320.

The signal pulses are then fed into the signal/reference pulse separator 324 through a polarisation maintaining fibre coupler 320. Signal pulses are coupled into the same axis, usually the slow axis of the polarisation maintaining fibre, from both output arms of the polarisation maintaining fibre coupler 320.

The long arm 322 of the signal/reference pulse separator 324 contains an optical fibre delay loop 323. The length difference of the two arms 321 and 322 corresponds to an optical propagation delay of $t_{reference}$. Typically the length of the delay loop 323 may be chosen to produce a delay $t_{reference} \sim 10$ ns. A photon travelling through the long arm 322 will lag that travelling through the short arm 321 by a time of $t_{reference}$ at the exit coupler 325 of the signal/reference pulse separator 324.

The two arms 321 and 322 are combined with an exit polarisation maintaining fibre optic coupler 325 which also serves as an entrance coupler of the encoding interferometer 333.

Coupling ratio of two couplers 320 and 325 can be either fixed or variable. The ratios are chosen so that the reference and signal pulses have unequal intensities. Typically, before entering the encoding interferometer 333, the later reference pulse is 10-10000 times stronger than the earlier signal pulse. For example, the entrance coupler 320 may be asymmetric so as to allow 90% to 99.99% of the input into arm 321 and the exit coupler 325 may be a 50/50 coupler. Alternatively, both the entrance 320 and exit couplers 325 may be 50/50 couplers and an appropriate attenuator placed in arm 321.

Properties of the signal and reference pulses are exactly the same, for example polarisation, wavelength etc, except of course for their intensity and time and port of injection into the interferometer 333.

The signal and reference pulses are then fed into the imbalanced Mach-Zender interferometer 333 through a polarisation maintaining fibre coupler 325. Signal and reference pulses are coupled into the same axis, usually the slow axis of the polarisation maintaining fibre, from both output arms of the polarisation maintaining fibre coupler 325.

The long arm 332 of the interferometer 333 contains an optical fibre delay loop 335, while the short arm 331 contains a fibre optic phase modulator 334. The length difference of the two arms 331 and 332 corresponds to an optical propagation delay of $t_{delay}$. Typically the length of the delay loop 335 may be chosen to produce a delay $t_{delay} \sim 5$ ns. A photon travelling through the long arm 332 will lag that travelling through the short arm 331 by a time of $t_{delay}$ at the exit 336 of the interferometer 333.

The two arms 331, 332 are combined together with a polarisation beam combiner 336 into a single mode fibre 338. The fibre inputs of the polarisation beam combiner 336 are aligned in such a way that only photons propagating along particular axes of the polarisation maintaining fibre are output from the combiner 336. Typically, photons which propagate along the slow axis and the fast axis are output by combiner 336 into fibre 338.

The polarising beam combiner 336 has two input ports, an in-line input port and a 90° input port. One of the input ports is connected to the long arm 332 of the interferometer 333 and the other input port is connected to the short arm 331 of the interferometer 333.

Only photons polarised along the slow axis of the in-line input fibre of the in-line input port are transmitted by the polarising beam coupler 336 and pass into the fibre 338. Photons polarised along the fast axis of the in-line input fibre of the input port are reflected and lost.

Meanwhile, at the 90° input port of the beam coupler 336, only photons polarised along the slow axis of the 90° input fibre are reflected by the beam coupler 336 and pass into the output port, while those polarised along the fast axis will be transmitted out of the beam coupler 336 and lost.

This means that the slow axis of one of the two input fibres is rotated by 90° relative to the output port. Alternatively the polarisation may be rotated using a polarisation rotator before one of the input ports of the polarising beam combiner 336.

Thus, photon pulses which passed through the long 332 and short arms 331 will have orthogonal polarisations.

Both the signal and reference pulses are then strongly attenuated by the attenuator 337 so that the average number of photons per pulse $\mu \ll 1$ for the signal pulses. The reference pulses are typically 10-1000 stronger than the signal pulses, and do not have to be attenuated to single photon level as information is only encoded upon signal pulses.

The attenuated pulses are then multiplexed with a bright laser clock source 302 at a different wavelength using a WDM coupler 339. The multiplexed signal is then transmitted to the receiver Bob 303 along an optical fibre link 305.

The clock may also be delivered in other ways. For example Alice may multiplex the signal pulses with a bright clock laser pulse at the same or different wavelength which is delayed relative to the start of the clock cycle and which does not coincide with the signal pulses. Alternatively the clock signal may be sent on a separate optical fibre. Alternatively, synchronisation may be achieved by using a timing reference.

Bob's equipment 303 comprises WDM coupler 341, a clock recovery unit 342 connected to one output of the WDM coupler 341, a polarisation controller 344 connected to the other output of the WDM controller 341, an imbalanced Mach-Zender interferometer 356 connected to the output of the polarisation controller 344, two single photon detectors R 361, B 363 connected to either outputs of interferometer 356 and biasing electronics 343.

Bob's interferometer 356 contains an entrance polarising beam splitter 351, a long arm 353 containing a delay loop 354 and a variable delay line 357 connected to one output of beam splitter 351, a short arm 352 containing a phase modulator 355 connected to the other output of beam splitter 351, and an exit polarisation maintaining 50/50 fibre coupler 358. All components in Bob's interferometer 356 are polarisation maintaining.

Bob first de-multiplexes the transmitted signal received from fibre 305 using the WDM coupler 341. The bright clock laser 302 signal is routed to an optical receiver 342 to recover the clock signal for Bob to synchronise with Alice.

If Alice delivers the clock using an alternative method, Bob will recover the clock accordingly. If Alice sends the clock signal as a single bright pulse within each clock cycle which is delayed relative to signal pulses then Bob may use an imbalanced coupler, such as 90/10, to extract a fraction of the combined signal which is measured with a photo-diode. A clock pulse is then recovered if the incident intensity is above an appropriately set threshold. Alternatively Bob may detect the clock on a separate fibre or using a timing reference.

The signal/reference pulses which are separated from the clock pulses by WDM coupler 341 are fed into a polarisation controller 344 to restore the original polarisation of the signal pulses. This is done so that signal pulses which travelled the short arm 331 in Alice's interferometer 333, will pass the long arm 353 in Bob's interferometer 356. Similarly, signal pulses which travelled through the long arm 332 of Alice's interferometer 333 will travel through the short arm 352 of Bob's interferometer.

The signal/reference pulses then pass through Bob's interferometer 356. An entrance polarising beam splitter 351 divides the incident pulses with orthogonal linear polarisations. The two outputs of the entrance polarisation beam splitter 351 are aligned such that the two output polarisations are both coupled into a particular axis, usually the slow axis, of the polarisation maintaining fibre. This ensures that signal pulses taking either arm will have the same polarisation at the exit 50/50 polarisation maintaining coupler 358. The long arm 353 of Bob's interferometer 356 contains an optical fibre delay loop 354 and a variable fibre delay line 357, and the short arm 352 contains a phase modulator 355. The two arms 352, 353 are connected to a 50/50 polarisation maintaining fibre coupler 358 with a single photon detector R 361, B 363 attached to each output arm.

Due to the use of polarising components, there are, in ideal cases, only two routes for a signal pulse travelling from the entrance of Alice's encoding interferometer 333 to the exit of Bob's interferometer 356:

i. Alice's Long Arm 332–Bob's Short Arm 352 (L-S) and
ii. Alice's Short Arm 331–Bob's Long Arm 353 (S-L).

The variable delay line 357 at Bob's interferometer 356 is adjusted to make the propagation time along routes (i) and (ii) almost equal, within the signal laser coherence time which is typically a few picoseconds for a semiconductor distributed feed back (DFB) laser diode, and thereby ensure interference of the two paths.

The variable fibre delay line 357 can either be an airgap, or a fibre stretcher, driven by a piezo-electric actuator. Alternatively, the two delays can be balanced by carefully controlling the length of fibre in Alice's 333 and Bob's 356 interferometers. Fine adjustment of the length of the two optical paths can be achieved through the calibration of zero phase delay in the two modulators 334, 355.

It is important that the central arrival time window of the signal pulses at single photon detectors do not overlap temporally with any arrival windows of the reference pulses. Otherwise, interference visibility will decrease. This can be guaranteed by carefully choosing the lengths of the delay loops 323, 335 to ensure $t_{delay} < t_{reference}$.

The references pulses are used to actively monitor and stabilise the phase drift of Alice-Bob's encoding interferometer. The detector R 361 can be a single photon detector. It is gated to be on only upon the central arrival time window of the reference peak to measure the count rate. If the system were perfectly stable, the counting rate is constant. Any phase drift will be manifested by a varying counting rate. Bob uses any variation in the count rate measured by the reference detector R361 as a feedback signal to the variable delay line 357. Thus the optical delay is adjusted to stabilise the counting rate in the reference detector, and compensate any phase drifts of Alice or Bob's interferometers.

It is most convenient to maintain that the reference detector with a minimum count rate. In this case, destructive interference is maintained at the reference detector R 361.

The reference detector R 361 and associated electronics should integrate the count rate over a certain period of time in order to average statistical fluctuation in the arrival rate of the reference photons. The integration time may typically be a fraction of a second, for example, 0.1 second. Such feedback times are sufficient since the phase drift of the Alice and Bob's interferometers occurs over much longer time scales. For highly unstable environment, much shorter feedback times, for example, 0.1 ms, may be employed. Alternatively, the feedback signal may be used to recalibrate the zero point of both phase modulator.

The feedback electronics may also condition system for sudden shocks to the system, such as a sudden change in temperature. If a sudden change in count rate is detected in the reference detector R 361, the results in the signal detector B 363 can be ignored until the system regains stability.

The references pulses are also used to actively monitor and stabilise the polarisation drift of photons. The two satellites peaks of the reference peak in FIG. 5b are due to imperfect polarisation control by the polarisation controller 344 and therefore imperfect polarisation beam splitting of the entrance polarisation beam splitter 351 of Bob's interferometer 356. The early satellite peak arises from the short arm 331 of Alice's encoding interferometer 333 to Bob's short arm 352, and the late satellite peak arises from the long arm 332 of Alice's encoding interferometer 333 to Bob's long arm 353. By gating the reference detector R 361 to detect during the arrival time of one of the satellite peaks and measuring the photon counting rate, Bob can monitor the polarisation drift of photons and actively stabilise it by feeding the measurement result back into the polarisation controller 344. The polarisation controller 344 rotates the polarisation of photons and minimise the count rate of the reference detector R 361.

The reference detector R 361 should integrate photon counts over a certain period of time in order to reduce statistical fluctuation. The integration time can again be as short as a fraction of a second, for example, 0.1 second. This is typically much faster than the time scale over which the polarisation drifts. Much shorter integration time can be chosen for system operates in unstable conditions.

The system in FIG. 5a is suitable for implementing the two-state protocol known as B92. In this case only one detector is needed on one output arm of Bob's interferometer for detecting encoded single photons. As the arm lengths are stabilised so that for zero phase delay the photon rate into the detector R is minimum, and the photon rate into the detector B 363 is minimum if the applied phase shift difference by two phase modulator is 0.

For the B92 protocol Alice applies phase shifts of 0 and 90° on her phase modulator 334 to the signal pulses. Alice associates 0 phase delay with bit=0, and 90° phase delay with bit=1. Bob applies 0 or 90° to his phase modulator 355 to the signal pulses, and associates 0° with bit=1 and 90° with bit=0. Note that Bob now applies phase shifts for bits 0 and 1 which differ by 180° compared to scheme in FIG. 3. After Bob's detections, he tells Alice in which clock cycle he detected a photon and they keep these bits to form a shared sifted key. They then perform error correction and privacy amplification upon the sifted key.

It is most important that Alice and Bob apply the modulation to the signal pulses only and not the reference pulses during the time the reference pulses passes their phase modulators, should be set to 0° or some other fixed value. This is to ensure that the reference pulses do not carry any encoded information and therefore an eavesdropper cannot gain any information from measuring the reference pulses. At the same time, interferences of these pulses are not affected by Alice and Bob's information encoding processes.

The biasing scheme for the apparatus shown in FIG. 5a is the same as shown in FIG. 4a-f.

Figure 6:
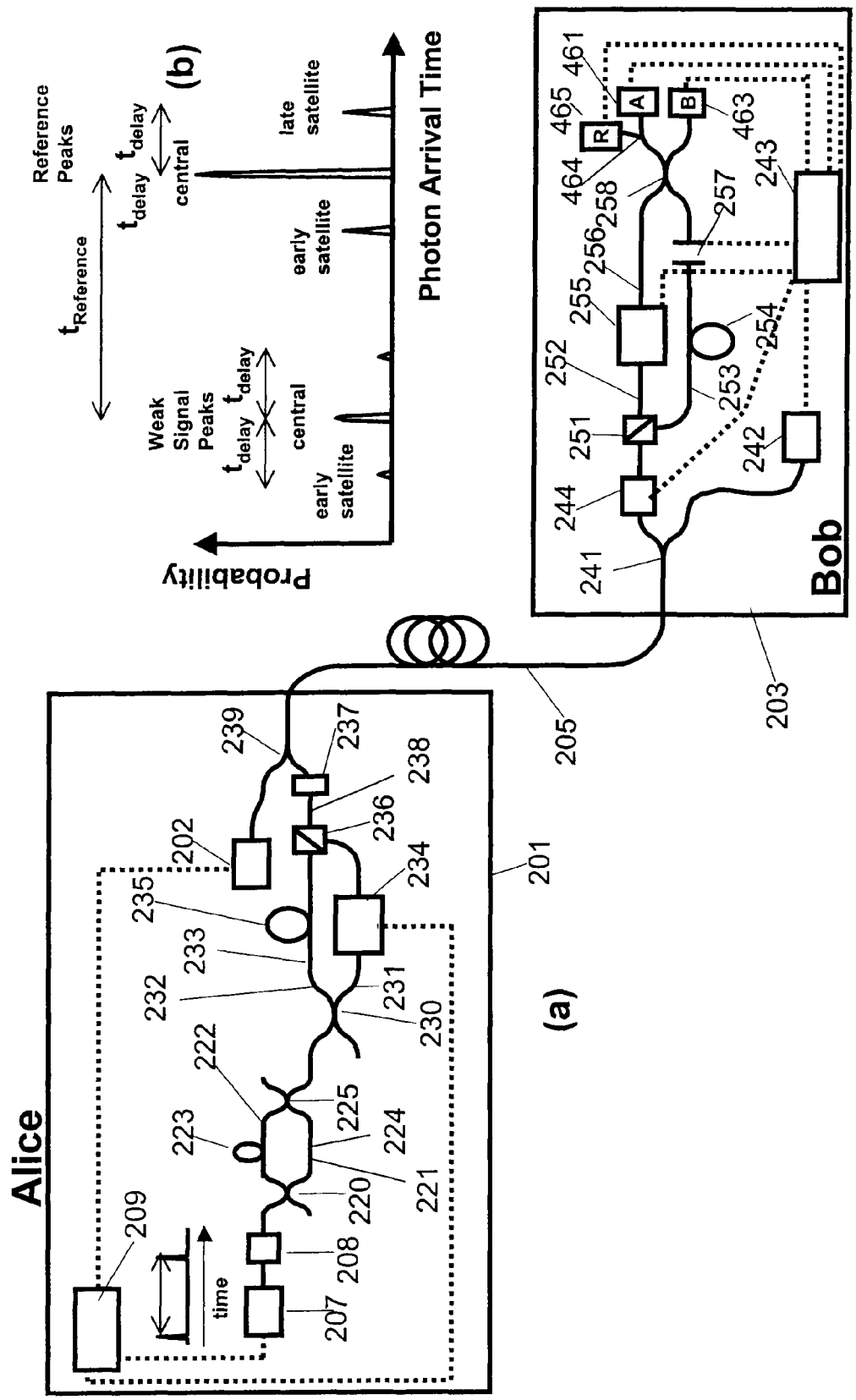
FIG. 6a is a quantum communication system in accordance with a preferred embodiment of the present invention optimised for use with the BB84 protocol and FIG. 6b is plot of the probability of a photon arriving at any of the three detectors of the system of FIG. 6a against time.

FIG. 6a shows an apparatus for quantum cryptography with active monitoring and stabilisation of polarisation and phase drift. It is suitable for BB84 protocol.

FIG. 6a is similar to FIG. 3a. To avoid unnecessary repetition, like reference numerals will be used to denote like features. The only difference is that one of the outputs of Bob's interferometer is attached with two single photon detectors R 465, A 461 through an asymmetric fibre optic coupler 464. The coupling ratio is typically 95/5, with 95% port attached with single photon detector A 461 for quantum key distribution, and the 5% port attached with single photon detector R 465 for monitoring and stabilising phase and polarisation drifts. The coupling ratio is chosen so high in order that the coupler 464 does not reduce photon count rate of the signal pulses significantly at the detector 461. Also, as the reference pulses can be set arbitrarily strong, 5% or even smaller coupling into the reference detector is enough for monitoring photon count rate of references pulses.

The references pulses are used to actively monitor and stabilise the phase drift of Alice-Bob's encoding interferometer. The detector R 465 can be a single photon detector. It is gated to be on only upon the central arrival time of the reference peak and measure the count rate. If the system were perfectly stable, the counting rate is constant. Any variation in phase drift will be manifested by a varying counting rate. Bob uses any variation in the count rate measured by the reference detector R 465 as a feedback signal to the variable delay line 257. Thus the optical delay is adjusted to stabilise the counting rate in the reference detector, and compensate any phase drifts of Alice or Bob's interferometers.

It is most convenient to maintain the reference detector with a minimum count rate. In this case, destructive interference is maintained at the reference detector R 465 and the signal detector A 461.

The reference detector R 465 and associated electronics should integrate the count rate over a certain period of time in order to average statistical fluctuation in the arrival rate of the reference photons. The integration time may typically be a fraction of a second, for example, 0.1 second. Such feedback times are sufficient since the phase drift of the Alice and Bob's interferometers occurs over much longer time scales. For highly unstable environment, much shorter feedback times, for example, 0.1 ms, may be employed. Alternatively, the feedback signal may be used to recalibrate the zero point of both phase modulator.

The feedback electronics may also condition system for sudden shocks to the system, such as a sudden change in temperature. If a sudden change in count rate is detected in the reference detector R 465, the results in the signal detectors A 461 and B 463 can be ignored until the system regains stability.

The references pulses are also used to actively monitor and stabilise the polarisation drift of photons. The two satellites peaks of the reference peak in FIG. 6b are due to imperfect polarisation control by the controller 244 and therefore imperfect polarisation beam splitting of the entrance polarisation beam splitter 251 of Bob's interferometer 256. The early satellite peak arises from the short arm 231 of Alice's encoding interferometer 233 to Bob's Short Arm 252, and the late satellite peak arises from the long arm 232 of Alice's encoding interferometer 233 to Bob's long arm 253. By gating the reference detector R 465 to detect during the arrival of one of the satellite peaks and measure the photon counting rate, Bob can monitor the drift in the polarisation of the photons and actively stabilise it by feeding the measurement result back into the polarisation controller 244. The polarisation controller 244 rotates the polarisation of photons so as to minimise the count rate of the satellite peak of the reference pulse in the reference detector R 465.

The reference detector R 465 should integrate photon counts over a certain period of time in order to reduce statistical fluctuation. The integration time can again be as short as a fraction of a second, for example, 0.1 second. This is typically much faster than the time scale over which the polarisation drifts. Much shorter integration time can be chosen for system operates in unstable conditions.

In the four-state protocol, which is sometimes referred to as BB84, Alice sets the voltage on her phase modulator to one of four different values, corresponding to phase shifts of 0°, 90°, 180°, and 270°. Phase 0° and 180° are associated with bits 0 and 1 in a first encoding basis, while 90° and 270° are associated with 0 and 1 in a second encoding basis. The second encoding basis is chosen to be non-orthogonal to the first. The phase shift is chosen at random for each signal pulse and Alice records the phase shift applied for each clock cycle.

Meanwhile Bob randomly varies the voltage applied to his phase modulator between two values corresponding to 0° and 90°. This amounts to selecting between the first and second measurement bases, respectively. Bob records the phase shift applied and the measurement result (i.e photon at detector A 461, photon at detector B 463, photon at detector A 461 and detector B 463, or no photon detected) for each clock cycle.

In the BB84 protocol, Alice and Bob can form a shared key by communicating on a classical channel after Bob's measurements have taken place. Bob tells Alice in which clock cycles he measured a photon and which measurement basis he used, but not the result of the measurement. Alice then tells Bob the clock cycles in which she used the same encoding basis and they agree to keep only those results, as in this case Bob will have made deterministic measurements upon the encoded photons. Bob associates a click at the signal detector A 461 with bit=1 and a click at the signal detector B 463 with bit=0. This is followed by error correction, to remove any errors in their shared key, and privacy amplification to exclude any information known to an eavesdropper.

Figure 7:
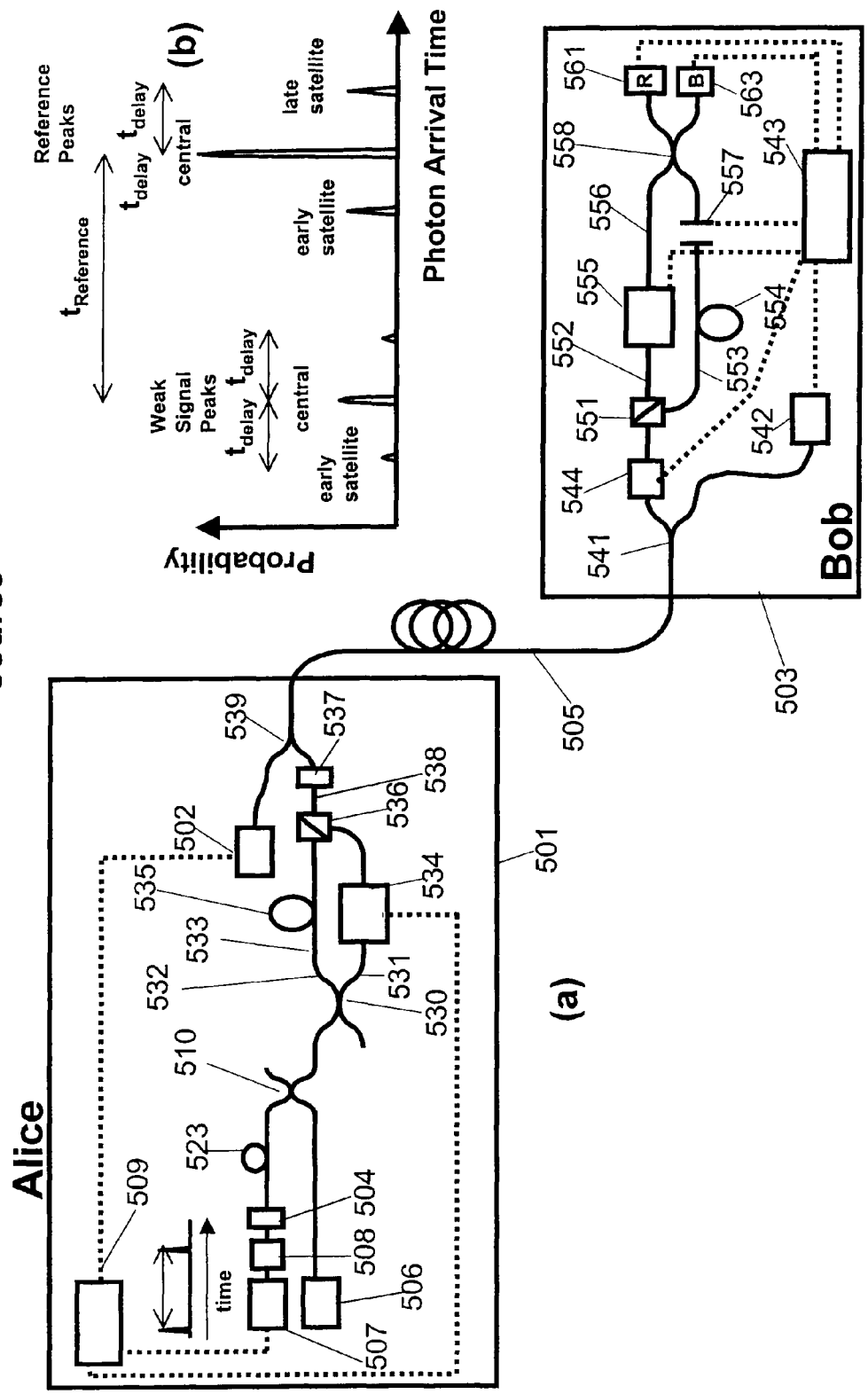
FIG. 7a is quantum communication system in accordance with a preferred embodiment of the present invention having a separate signal pulse source and reference pulse source and FIG. 7b is a plot of the probability of a photon arriving at either of the detectors of the system of FIG. 7a against time.

FIG. 7a shows an apparatus for quantum cryptography with a single photon source and a laser diode as a reference.

FIG. 7a is similar to FIG. 3a. The main difference is that the signal pulse is replaced with a truly single photon source.

Alice and Bob's equipment is similar to that described with reference to FIG. 3a. Alice 501 sends photons to Bob 503 along fibre 505.

Alice's equipment 501 comprises a reference laser diode 507, a polarised single photon source 506, a polarisation rotator 508 receiving the output of said laser diode 507, an attenuator 504 receiving the output of said polarisation rotator 508, a delay loop 523 receiving the output of said attenuator 504, a polarisation maintaining fibre optic coupler 510 coupling the output from said delay loop 523 and said single photon source 506, an imbalanced fibre Mach-Zender interferometer 533 receiving the output from said coupler 510, a narrow band pass filter 537 receiving the output from said interferometer 533, a bright clock laser 502, a wavelength division multiplexing (WDM) coupler 539 coupling the output from filter 537 and clock laser 502 and bias electronics 509.

The interferometer 533 consists of an entrance coupler 530 connected to both: a long arm 532 with a loop of fibre 535 designed to cause an optical delay; and a short arm 531 with a phase modulator 534, and an exit polarising beam combiner 536. All components used in Alice's interferometer 533 are polarisation maintaining.

During each clock signal, the reference laser diode 507 outputs one reference pulse and the single photon source 506 emits a polarised single photon signal pulse.

The polarisation of the reference pulse is rotated by a polarisation rotator 508 so that the polarisation is aligned to be parallel to a particular axis of the polarisation maintaining fibre, usually the slow axis, of the entrance port of the polarisation maintaining fibre coupler 510. Alternatively the polarisation rotator 508 may be omitted by rotating the signal laser diode 507 with respect to the axes of the entrance of polarisation maintaining coupler 510.

The reference pulses are then attenuated by the attenuator 504 so that on average each reference pulse typically contains 10-10000 photons when leaving Alice's apparatus 501.

The polarisation of the single photon signal pulse is aligned to the same axis to the polarisation maintaining fibre of the polarisation maintaining coupler 510 as the attenuated reference pulses.

The reference pulse passes a delay loop 523, and then is combined with the single photon signal pulses by a polarisation maintaining fibre optic coupler 510. The coupling ratio is typically 99.5/0.5. It is chosen so that the single photon source is hardly attenuated when passing this fibre coupler 510 before entering the imbalanced interferometer 533.

The delay loop 523 causes an optical propagation delay of $t_{reference}$. Typically the length of the delay loop 523 may be chosen to produce a delay $t_{reference}$~10 ns. Reference pulses lag single photon pulses by a time of $t_{reference}$ at the exit port of the polarisation maintaining fibre coupler 510.

The output of the coupler with hardly attenuated single photon pulses is connected into an input of the imbalanced Mach-Zender interferometer 533.

The wavelength of the reference laser diode 507 has to be chosen nearly the same as that of the single photon source.

The single photon and reference pulses are then fed into the imbalance Mach-Zender interferometer 533 through a polarisation maintaining fibre coupler 530. Signal pulses are coupled into the same axis, usually the slow axis of the polarisation maintaining fibre, from both output arms of the polarisation maintaining fibre coupler 530.

The long arm 532 of the interferometer 533 contains an optical fibre delay loop 535, while the short arm 531 contains a fibre optic phase modulator 534. The length difference of the two arms 531 and 532 corresponds to an optical propagation delay of $t_{delay}$. Typically the length of the delay loop 535 may be chosen to produce a delay $t_{delay}$~5 ns. A photon travelling through the long arm 532 will lag that travelling through the short arm 531 by a time of $t_{delay}$ at the exit 536 of the interferometer 533.

The two arms 531, 532 are combined together with a polarisation beam combiner 536 into a single mode fibre 538. The fibre inputs of the polarisation beam combiner 536 are aligned in such a way that only photons propagating along particular axes of the polarisation maintaining fibre are outputted from the combiner 536. Typically, photons which propagate along the slow axis and the fast axis are output by combiner 536 into fibre 538.

The polarising beam combiner 536 has two input ports, an in-line input port and a 90° input port. One of the input ports is connected to the long arm 532 of the interferometer 533 and the other input port is connected to the short arm 531 of the interferometer 533.

Only photons polarised along the slow axis of the in-line input fibre of the in-line input port are transmitted by the polarising beam coupler 536 and pass into the fibre 538. Photons polarised along the fast axis of the in-line input fibre of the input port are reflected and lost.

Meanwhile, at the 90° input port of the beam coupler 536, only photons polarised along the slow axis of the 90° input fibre are reflected by the beam coupler 536 and pass into the output port, while those polarised along the fast axis will be transmitted out of the beam coupler 536 and lost.

This means that the slow axis of one of the two input fibres is rotated by 90° relative to the output port. Alternatively the polarisation may be rotated using a polarisation rotator before one of the input ports of the polarising beam combiner 536.

Thus, photon pulses which passed through the long 532 and short arms 531 will have orthogonal polarisations.

The single photon signal pulses and reference pulses then pass through a narrow band pass filter 537 whose transmission window is spectrally centred at the wavelength of the single photon signal source. The filtered reference pulses then have the exact same wavelength as the single photon source.

The filtered pulses are then multiplexed with a bright laser clock source 502 at a different wavelength using a WDM coupler 539. The multiplexed signal is then transmitted to the receiver Bob 503 along an optical fibre link 505.

The clock may also be delivered in other ways. For example Alice may multiplex the signal pulses with a bright clock laser pulse at the same or different wavelength which is delayed relative to the start of the clock cycle and which does not coincide with the signal pulses. Alternatively the clock signal may be sent on a separate optical fibre. Alternatively, synchronisation may be achieved by using a timing reference.

Bob's equipment 503 comprises WDM coupler 541, a clock recovery unit 542 connected to one output of the WDM coupler 541, a polarisation controller 544 connected to the other output of WDM coupler 541, an imbalanced Mach-Zender interferometer 556 connected to the output of polarisation controller 544, two single photon detectors R 561, B 563 connected to the two outputs of interferometer 556 and biasing electronics 543.

Bob's interferometer 556 comprises an entrance polarising beam splitter 551, a long arm 553 containing a delay loop 554 and a variable delay line 557, a short arm 552 containing a phase modulator 555, and an exit polarisation maintaining 50/50 fibre coupler 558. All components in Bob's interferometer 556 are polarisation maintaining.

Bob first de-multiplexes the transmitted signal received from fibre 505 using the WDM coupler 541. The bright clock laser 502 signal is routed to an optical receiver 542 to recover the clock signal for Bob to synchronise with Alice.

If Alice delivers the clock using an alternative method, Bob will recover the clock accordingly. If Alice sends the clock signal as a single bright pulse within each clock cycle which is delayed relative to signal pulses then Bob may use an imbalanced coupler, such as 90/10, to extract a fraction of the combined signal which is measured with a photo-diode. A clock pulse is then recovered if the incident intensity is above an appropriately set threshold. Alternatively Bob may detect the clock on a separate fibre or using a timing reference.

The single photon and references pulses which are separated from the clock pulses by WDM coupler 541 are fed into a polarisation controller 544 to restore the original polarisation of the signal pulses. This is done so that signal pulses which travelled the short arm 531 in Alice's interferometer 533, will pass the long arm 553 in Bob's interferometer 556. Similarly, signal pulses which travelled through the long arm 532 of Alice's interferometer 533 will travel through the short arm 552 of Bob's interferometer 556.

The single photon source and reference pulses then pass Bob's interferometer 556. An entrance polarising beam splitter 551 divides the incident pulses with orthogonal linear polarisations. The two outputs of the entrance polarisation beam splitter 551 are aligned such that the two output polarisations are both coupled into a particular axis, usually the slow axis, of the polarisation maintaining fibre. This ensures that signal pulses taking either arm will have the same polarisation at the exit 50/50 polarisation maintaining coupler 558. The long arm 553 of Bob's interferometer 556 contains an optical fibre delay loop 554 and a variable fibre delay line 557, and the short arm 552 contains a phase modulator 555. The two arms 552, 553 are connected to a 50/50 polarisation maintaining fibre coupler 558 with a single photon detector R 561, B 563 attached to each output arm.

Due to the use of polarising components, there are, in ideal cases, only two routes for a single photon or a reference pulse travelling from the entrance of Alice's encoding interferometer 533 to the exit of Bob's interferometer 556:
i. Alice's Long Arm 532–Bob's Short Arm 552 (L-S) and
ii. Alice's Short Arm 531–Bob's Long Arm 553 (S-L).

The variable delay line 557 at Bob's interferometer 556 is adjusted to make the propagation time along routes (i) and (ii) almost equal, within the signal laser coherence time which is typically a few picoseconds for a semiconductor distributed feed back (DFB) laser diode, and thereby ensure interference of the two paths.

The variable fibre delay line 557 can either be an airgap, or a fibre stretcher, driven by a piezo-electric actuator. Alternatively, the two delays can be balanced by carefully controlling the length of fibre in Alice's 533 and Bob's 556 interferometers. Fine adjustment of the length of the two optical paths can be achieved through the calibration of zero phase delay in the two modulators 534, 555.

It is important that the central arrival time window of the signal pulses at single photon detectors do not overlap temporally with any arrival windows of the reference pulses. Otherwise, interference visibility will decrease. This can be guaranteed by carefully choosing the lengths of the delay loops 523, 535 to ensure $t_{delay} < t_{reference}$.

The references pulses are used to actively monitor and stabilise the phase drift of Alice-Bob's encoding interferometer. The detector R 561 can be a single photon detector. It is gated to be on only upon the central arrival time of the reference peak and measure the count rate. If the system were perfectly stable, the counting rate is constant. Any variation in phase drift will be manifested by a varying counting rate. Bob uses any variation in the count rate measured by the reference detector R 561 as a feedback signal to the variable delay line 557. Thus the optical delay is adjusted to stabilise the counting rate in the reference detector, and compensate any phase drifts of Alice or Bob's interferometers.

It is most convenient to maintain the reference detector with a minimum count rate. In this case, destructive interference is maintained at the reference detector R 561.

The reference detector R 561 and associated electronics should integrate the count rate over a certain period of time in order to average statistical fluctuation in the arrival rate of the reference photons. The integration time may typically be a fraction of a second, for example, 0.1 second. Such feedback times are sufficient since the phase drift of the Alice and Bob's interferometers occurs over much longer time scales. For highly unstable environment, much shorter feedback times, for example, 0.1 ms, may be employed. Alternatively, the feedback signal may be used to recalibrate the zero point of both phase modulator.

The feedback electronics may also condition system for sudden shocks to the system, such as a sudden change in temperature. If a sudden change in count rate is detected in the reference detector R 561, the results in the signal detector B 563 can be ignored until the system regains stability.

The references pulses are also used to actively monitor and stabilise the polarisation drift of photons. The two satellites peaks of the reference peak in FIG. 7b are due to imperfect polarisation control by the controller 544 and therefore imperfect polarisation beam splitting of the entrance polarisation beam splitter 551 of Bob's interferometer 556. The early satellite peak arises from the short arm 531 of Alice's encoding interferometer 533 to Bob's Short Arm 552, and the late satellite peak arises from the long arm 532 of Alice's encoding interferometer 533 to Bob's long arm 553. By gating the reference detector R 561 to detect during the arrival of one of the satellite peaks and measure the photon counting rate, Bob can monitor the drift in the polarisation of the photons and actively stabilise it by feeding the measurement result back into the polarisation controller 544. The polarisation controller 544 rotates the polarisation of photons so as to minimise the count rate of the satellite peak of the reference pulse in the reference detector R 561.

The reference detector R 561 should integrate photon counts over a certain period of time in order to reduce statistical fluctuation. The integration time can again be as short as a fraction of a second, for example, 0.1 second. This is typically much faster than the time scale over which the polarisation drifts. Much shorter integration time can be chosen for system operates in unstable conditions.

The system in FIG. 7a is suitable for implementing the two-state protocol known as B92. In this case only one detector is needed on one output arm of Bob's interferometer for detecting encoded single photons. As the arm lengths are stabilised so that for zero phase delay the photon rate into the detector R 561 is minimum, and the photon rate into the detector B 563 is maximum.

For the B92 protocol Alice applies phase shifts of 0 and 90° on her phase modulator 534 to the signal pulses. Alice associates 0 phase delay with bit=0, and 90° phase delay with bit=1. Bob applies 180° or 270° to his phase modulator 555 to the signal pulses, and associates 180° with bit=1 and 270° with bit=0. After Bob's detections, he tells Alice in which clock cycle he detected a photon and they keep these bits to form a shared sifted key. They then perform error correction and privacy amplification upon the sifted key.

It is most important that Alice and Bob apply the modulation to the signal pulses only and not the reference pulses during the time the reference pulses passes their phase modulators, should be set to 0° or some other fixed value. This is to ensure that the reference pulses do not carry any encoded information and therefore an eavesdropper cannot gain any information from measuring the reference pulses. At the same time, interferences of these pulses are not affected by Alice and Bob's information encoding processes.

Figure 8:
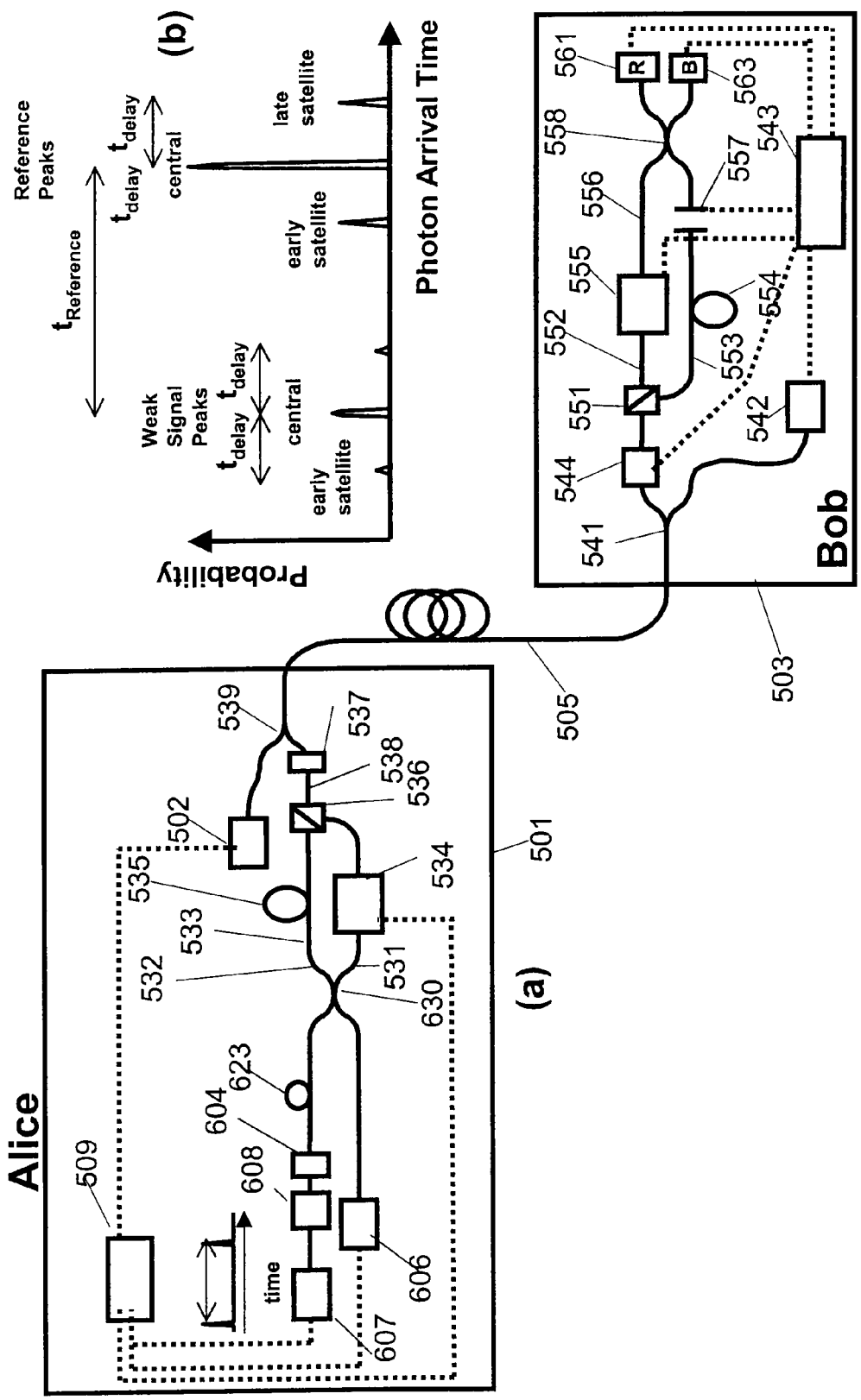
FIG. 8a is a quantum communication system in accordance with a preferred embodiment of the present invention showing a variation on the source arrangement of the system of FIG. 7a and FIG. 8b is a plot of the probability of a photon arriving at either of the detectors of the system of FIG. 8a against time.

FIG. 8a shows an apparatus for quantum cryptography with a single photon source and a reference laser diode for active monitor and stabilisation of phase and polarisation drifts.

Alice and Bob's equipment is similar to that described with reference to FIG. 7a. Thus, to avoid unnecessary repetition, like reference numerals will be used to denote like features The only difference is that the single photon source and the reference pulses enter Alice's interferometer 533 through different ports. Specifically, Alice's equipment comprises a reference laser diode 607, a polarised single photon source 606, a polarisation rotator 608 receiving the output of said reference laser diode 607, an attenuator 604 receiving the output from said polarisation rotator 608, a delay loop 623 connected to the output of said polarisation rotator, an imbalanced fibre Mach-Zender interferometer 533 receiving the output from both delay loop 623 and single photon source 606, a bright clock laser 502, a wavelength division multiplexing (WDM) coupler 539 coupling the output from both filter 537 and clock laser 502, and finally bias electronics 509.

The interferometer is the same as that described with reference to FIG. 7a and has an entrance coupler 630 connected to long arm 532 and short arm 531.

During each clock signal, the reference laser diode 607 outputs one reference pulse and the single photon source 606 emits a polarised single photon pulse.

The polarisation of the reference pulse is rotated by a polarisation rotator 608 so that the polarisation is aligned to be parallel to a particular axis of the polarisation maintaining fibre, usually the slow axis, of one entrance port of the polarisation maintaining fibre coupler 630 of interferometer 533. Alternatively, the polarisation rotator 608 may be omitted by rotating the signal laser diode 607 with respect to the axes of the selected entrance port of entrance couple 630. The reference pulses are then attenuated by attenuator 604 so that on average, each reference pulse typically contains 10-10,000 photons when leaving Alice's apparatus 501.

The output of the single photon source 606 is received by the other entrance port of entrance coupler 630. Although the reference pulse and the signal pulse enter the entrance coupler 630 through different ports, they are both aligned to the same polarisation axis of the polarisation maintaining fibres of coupler 630. The photons are then processed in the same manner as described with reference to FIG. 7a.

FIG. 8b is a plot of probability of a photon arriving at either of detectors R 561 and B 563 against time. As explained with reference to FIG. 3a, a central reference peak with early and late satellites and a central signal peak with late and early satellites are observed.

Figure 9:
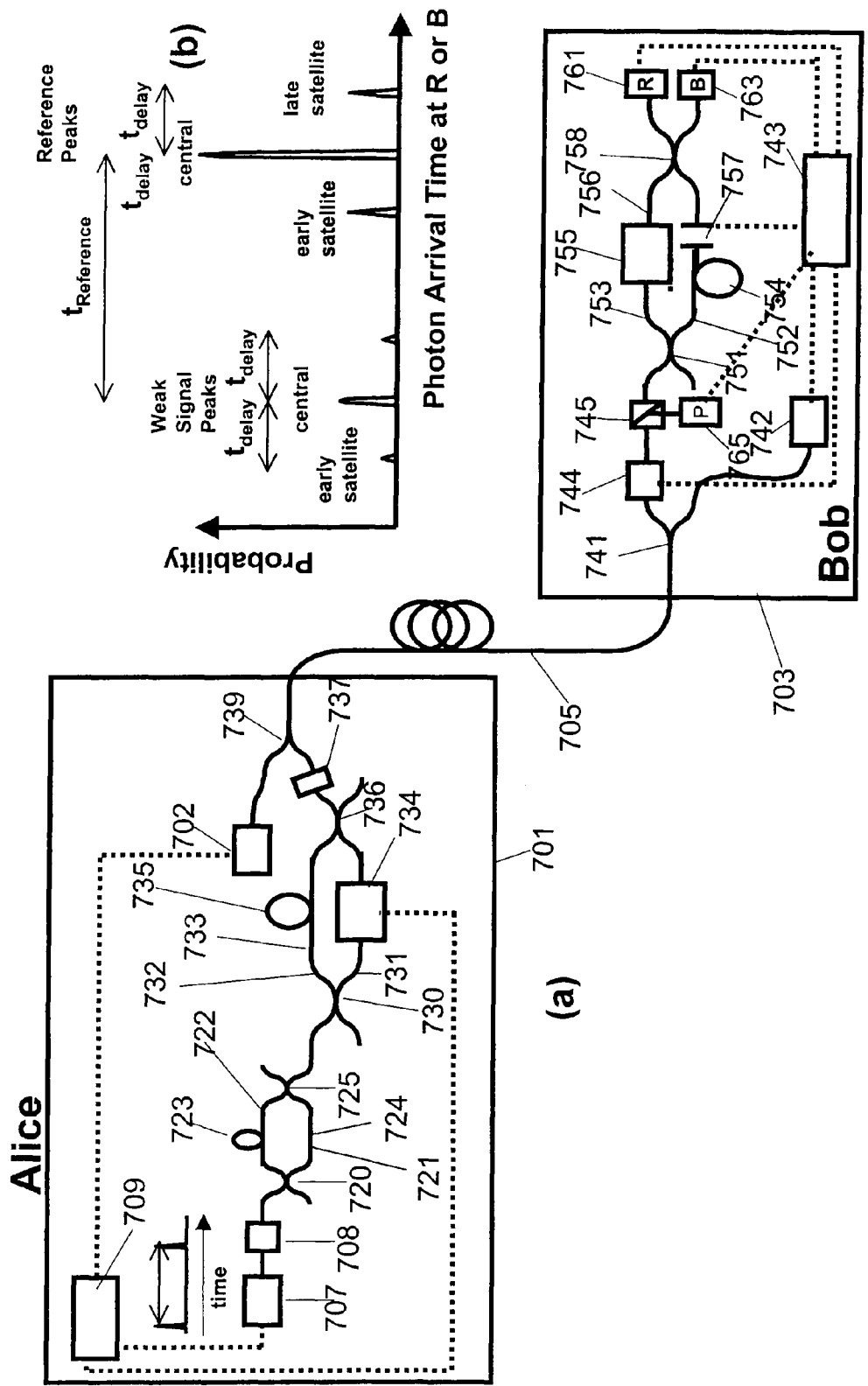
FIG. 9a is a quantum communication system in accordance with a preferred embodiment of the present invention where photons transmitted between the emitter and receiver have the same polarisation and FIG. 9b is a plot of the probability of a photon arriving at either of the two detectors connected to the interferometer of the receiver of FIG. 9a against time.

FIG. 9a shows an apparatus for quantum cryptography with active stabilisation.

Alice and Bob's equipment is similar to that described with reference to FIG. 3a. The main difference is that polarisation division is not used in FIG. 9a.

Alice's equipment 701 comprises a signal laser diode 707, a polarisation rotator 708 receiving the output of said signal laser diode 707, a signal/reference pulse separator 724 receiving the output of said polarisation rotator 708, an imbalanced fibre Mach-Zender interferometer 733 for encoding photons receiving the output from said pulse separator 724, an attenuator 737 attenuating the output of said interferometer, a bright clock laser 702, a wavelength division multiplexing (WDM) coupler 739 coupling the output from said clock laser 702 and said attenuator 737 and bias electronics 709.

The signal/reference pulse separator 724 comprises an entrance fibre optic coupler 720 connected to: a long arm 722 with a loop of fibre 723 designed to cause an optical delay; and a short arm 721, the separator further comprising an exit fibre optic coupler 725 combining two arms 721 and 722. All fibre in the separator 724 is polarisation maintaining.

The encoding interferometer 733 consists of an entrance coupler 730 connected to both: a long arm 732 with a loop of fibre 735 designed to cause an optical delay; and a short arm 731 with a phase modulator 734, the interferometer 733 further comprising an exit polarising maintaining fibre coupler 736. All components used in Alice's interferometer 733 are polarisation maintaining.

During each clock signal, the signal laser diode laser 707 outputs one optical pulse.

The polarisation of the pulses is rotated by a polarisation rotator 708 so that the polarisation is aligned to be parallel to a particular axis of the polarisation maintaining fibre, usually the slow axis, of the entrance coupler 720 of the signal/reference pulse separator 724. Alternatively the polarisation rotator 708 may be omitted by rotating the signal laser diode 707 with respect to the axes of the entrance coupler 720.

The pulses are then fed into the signal/reference pulse separator 724 through a polarisation maintaining fibre coupler 720. The pulses are coupled into the same axis, usually the slow axis of the polarisation maintaining fibre, from both output arms of the polarisation maintaining fibre coupler 720.

The long arm 722 of the separator 724 contains an optical fibre delay loop 723. The length difference of the two arms 721 and 722 corresponds to an optical propagation delay of $t_{reference}$. Typically the length of the delay loop 723 may be chosen to produce a delay $t_{reference} \sim 10$ ns. A photon travelling through the long arm 722 will lag that travelling through the short arm 721 by a time of $t_{reference}$ at the exit coupler 725 of the separator 724.

The two arms 721 and 722 are combined together with an exit polarisation maintaining fibre optic coupler 725. One output is connected into one input of the encoding Mach-Zender interferometer 733.

Coupling ratio of two couplers 720 and 725 can be either fixed or variable. The ratios are chosen so that the signal and reference pulses have unequal intensities. Typically, before entering the encoding interferometer 733, the reference pulse is 10-10000 times stronger than the signal pulse.

Properties of the signal and reference pulses are exactly the same, for example polarisation, wavelength etc, except of course for their intensity and time of injection into the interferometer 733.

The signal and reference pulses are then fed into the imbalanced Mach-Zender interferometer 733 through a polarisation maintaining fibre coupler 730. Signal and reference pulses are coupled into the same axis, usually the slow axis of the polarisation maintaining fibre, from both output arms of the polarisation maintaining fibre coupler 730.

The long arm 732 of the interferometer 733 contains an optical fibre delay loop 735, while the short arm 731 contains a fibre optic phase modulator 734. The length difference of the two arms 731 and 732 corresponds to an optical propagation delay of $t_{delay}$. Typically the length of the delay loop 735 may be chosen to produce a delay $t_{delay} \sim 5$ ns. A photon travelling through the long arm 732 will lag that travelling through the short arm 731 by a time of $t_{delay}$ at the exit 736 of the interferometer 733.

The two arms 731, 732 are combined together with a polarisation maintaining fibre coupler 736 into a single mode fibre.

Thus, photon pulses which passed through the long 732 and short arms 731 will have same polarisation.

Both the signal and reference pulses are then strongly attenuated by the attenuator 737 so that the average number of photons per pulse $\mu \ll 1$ for the signal pulses. The reference pulses are typically 10-1000 stronger than the signal pulses, and do not have to be attenuated to single photon level as information is only encoded upon signal pulses.

The attenuated pulses are then multiplexed with a bright laser clock source 702 at a different wavelength using a WDM coupler 739. The multiplexed signal is then transmitted to the receiver Bob 703 along an optical fibre link 705.

Bob's equipment 703 comprises WDM coupler 741, a clock recovery unit 742 connected to one output of said WDM coupler 741, a polarisation controller 744 connected to the other output of said WDM coupler 741, a polarisation beam splitter 745 connected to the output of said polarisation controller, an imbalanced Mach-Zender interferometer 756 connected to a first output of said polarisation beam splitter 745, three single photon detectors R 761, B 763, P 765, two, R 761 and B 763, connected to the two outputs of interferometer 756 and the other P 765 connected to a second output of said polarisation beam splitter 745, and biasing electronics 743. Bob's interferometer 756 contains an entrance polarising maintaining coupler 751, a long arm 752 containing a delay loop 754 and a variable delay line 757, a short arm 753 containing a phase modulator 755, and an exit polarisation maintaining 50/50 fibre coupler 758. All components in Bob's interferometer 756 are polarisation maintaining.

Bob first de-multiplexes the transmitted signal received from fibre 705 using the WDM coupler 741. The bright clock laser 702 signal is routed to an optical receiver 742 to recover the clock signal for Bob to synchronise with Alice.

The signal and reference pulses which are separated from the clock pulses by WDM coupler 741 are fed into a polarisation controller 744 to restore the original polarisation of the signal pulses. This is done so that all photons can pass through the polarisation beam splitter 745.

The signal and reference pulses then pass Bob's interferometer 756. An entrance polarising maintaining fibre coupler 751 splits the incident pulses into two arms with same polarisation. The two outputs of the entrance coupler 751 are aligned such that the two output polarisations are both coupled into a particular axis, usually the slow axis, of the polarisation maintaining fibre. This ensures that signal pulses taking either arm will have the same polarisation at the exit 50/50 polarisation maintaining coupler 758. The long arm 753 of Bob's interferometer 756 contains an optical fibre delay loop 754 and a variable fibre delay line 757, and the short arm 752 contains a phase modulator 755. The two arms 752, 753 are connected to a 50/50 polarisation maintaining fibre coupler 758 with a single photon detector R 761, B 763 attached to each output arm.

There are four routes for a signal pulse travelling from the entrance of Alice's encoding interferometer 733 to the exit of Bob's interferometer 756:
i. Alice's Short Arm 731–Bob's Short Arm 753 (S-S);
ii. Alice's Long Arm 732–Bob's Short Arm 753 (L-S);
iii. Alice's Short Arm 731–Bob's Long Arm 752 (S-L); and
iv. Alice's Long Arm 732–Bob's Long Arm 752.

The variable delay line 757 at Bob's interferometer 756 is adjusted to make the propagation time along routes (ii) and (iii) almost equal, within the signal laser coherence time which is typically a few picoseconds for a semiconductor distributed feed back (DFB) laser diode, and thereby ensure interference of the two paths.

The variable fiber delay line 757 can either be an airgap, or a fibre stretcher, driven by a piezo-electric actuator. Alternatively, the two delays can be balanced by carefully controlling the length of fibre in Alice's 733 and Bob's 756 interferometers. Fine adjustment of the length of the two optical paths can be achieved through the calibration of zero phase delay in the two modulators 734, 755.

Only photons arriving at the central windows at detectors R 761 and B 763 undergo interferences and are thus of interest.

It is important that the central arrival time window of the signal pulses at single photon detectors do not overlap temporally with any arrival windows of the reference pulses. Otherwise, interference visibility will decrease. This can be guaranteed by carefully choosing the lengths of the delay loops 723, 735 to ensure $t_{delay} < t_{reference}$.

The references pulses are used to actively monitor and stabilise the phase drift of Alice-Bob's encoding interferometer. The detector R 761 can be a single photon detector. It is gated to be on only upon the central arrival time of the reference peak and measure the count rate. If the system were perfectly stable, the counting rate is constant. Any variation in phase drift will be manifested by a varying counting rate. Bob uses any variation in the count rate measured by the reference detector R 761 as a feedback signal to the variable delay line 757. Thus the optical delay is adjusted to stabilise the counting rate in the reference detector, and compensate any phase drifts of Alice or Bob's interferometers.

It is most convenient to maintain the reference detector with a minimum count rate. In this case, destructive interference is maintained at the reference detector R 761.

The reference detector R 761 and associated electronics should integrate the count rate over a certain period of time in order to average statistical fluctuation in the arrival rate of the reference photons. The integration time may typically be a fraction of a second, for example, 0.1 second. Such feedback times are sufficient since the phase drift of the Alice and Bob's interferometers occurs over much longer time scales. For highly unstable environment, much shorter feedback times, for example, 0.1 ms, may be employed. Alternatively, the feedback signal may be used to recalibrate the zero point of both phase modulator.

The feedback electronics may also condition system for sudden shocks to the system, such as a sudden change in temperature. If a sudden change in count rate is detected in the reference detector R 761, the results in the signal detector B 763 can be ignored until the system regains stability.

The references pulses are also used to actively monitor and stabilise the polarisation of photons with the help of the single photon detector P 765.

The single photon detector P 765 is attached to reflecting port of the polarisation beam splitter 745. If the polarisation controller fully recover the polarisation of the signal pulses, all photons will be transmitted and no photons will be reflected into the single photon detector P 765. If there is a polarisation drift, part of the signal photons will be reflected into the single photon detector P 765.

There will be two time windows of photons arriving at the detector P 765 for each signal or reference pulse. The separation of two arriving window is $t_{delay}$. The early window corresponds to photons passing through the short arm 731 of Alice's interferometer, and the late window corresponds to photons passing through the long arm 732 of Alice's interferometer.

By gating the detector P 765 to detect during at least one of the arrival windows of the reference pulses and measure the photon counting rate, Bob can monitor the drift in the polarisation of the photons and actively stabilise it by feeding the measurement result into the polarisation controller 744. The polarisation controller 744 adjusts according to the feed back and minimise the photon count rate, and thus maintain the polarisation of the photon pulses.

The detector P 765 should integrate photon counts over a certain period of time in order to reduce statistical fluctuation. The integration time can again be as short as a fraction of a second, for example, 0.1 second. This is typically much faster than the time scale over which the polarisation drifts. Much shorter integration time can be chosen for system operates in unstable conditions.

The invention claimed is:

1. A quantum communication system comprising an emitter and a receiver, said emitter comprising an encoder and at least one photon source, said emitter configured to pass a signal pulse and a reference pulse, which are separated in time, the signal and reference pulses being separated in time prior to entry into said encoder, said receiver comprising a decoder and at least one detector for measuring said signal pulse and said reference pulse, wherein the signal pulse is encoded as said signal pulse passes through the encoder and the reference pulse when passing through the encoder is encoded with information which is uncorrelated with that of the encoding of the signal pulse, wherein a reference detector is configured to detect variations in the phase of said reference pulse; and wherein said receiver further comprises an integrator for integrating a count value of said reference detector.

2. A quantum communication system according to claim 1, wherein an average number of photons per signal pulse is less than one photon and an average number of photons per reference pulse is greater than the average number of photons per signal pulse, the signal and reference pulses being separated in time prior to entry into said encoder.

3. A quantum communication system according to claim 1, wherein the encoder is a phase encoder comprising an encoding interferometer said encoding interferometer comprising an entrance member connected to a long arm and a short arm, said long arm and said short arm joined at their other ends by an exit member, one of said arms having a phase modulator which allows the phase of a photon passing through that arm to be set to one of at least two values.

4. A quantum communication system according to claim 3, wherein said decoder is a phase decoder comprising a decoding interferometer, said decoding interferometer comprises an entrance member connected to a long arm and a short arm, said long arm and said short arm being joined at their other ends by an exit member, one of said arms having a phase modulator which allows the phase of a photon passing through that arm to be set to one of at least two values.

5. A quantum communication system according to claim 4, further comprising a polarisation director for directing photons which have passed through the long arm of the encoding interferometer through the short arm of the decoding interferometer and for directing photons which have passed through the short arm of the encoding interferometer through the long arm of the decoding interferometer.

6. A quantum communication system according to claim 1, wherein the receiver further comprises a feedback system for altering a component of the receiver on the basis of the measured reference signal.

7. A quantum communication system according to claim 6, wherein the component is a polarisation controller.

8. A quantum communication system according to claim 7, wherein photons in the emitter are configured to be emitted with a first polarisation direction and the receiver comprises a polarisation beam splitter configured to direct photons with an orthogonal polarisation direction to the first polarisation direction into a detector for measuring said reference pulse.

9. A quantum communication system according to claim 5 wherein a component of the receiver is a polarisation controller and, wherein the receiver comprises at least one detector configured to measure signals arising due to photons either passing through the long arms of both interferometers or the short arms of both interferometers.

10. A quantum communication system according to claim 4, wherein the receiver further comprises a feedback system for altering a component of the receiver on the basis of the measured reference signal and said component is configured to vary the length of one of the arms of said decoding interferometer.

11. A quantum communication system according to claim 4, wherein the receiver further comprises a feedback system for altering a component of the receiver on the basis of the measured reference signal and said component is said phase modulator, said feedback system being configured to finely adjust said phase applied by said phase modulator.

12. A quantum communication system according to claim 10, wherein a reference detector to detect the reference pulse is provided to receive an output from the exit member of said decoder.

13. A method of communicating photon pulses from an emitter to a receiver, comprising:
generating a signal pulse and a reference pulse separated in time in an emitter;
passing both the signal pulse and the reference pulse through the same encoder in said emitter and sending said pulses to a receiver, said signal pulse and reference pulse being temporally separated as they enter said encoder, wherein the signal pulse is encoded as the signal pulse passes through the encoder and the reference pulse when passing through the encoder is encoded with information which is uncorrelated with that of the encoding of the signal pulse; and
measuring both the signal pulse and the reference pulse in said receiver, including detecting variations in the phase of said reference pulse, and integrating a count rate of said reference pulse.

14. A method according to claim 13, further comprising altering a component of said receiver on the basis of the measured reference pulse.

15. A method of outputting photons from an emitter, the method comprising:
generating a signal pulse and a reference pulse separated in time in an emitter;
passing both the signal pulse and the reference pulse through the same encoder in said emitter and outputting said pulses, wherein the signal pulse is encoded as the signal pulse passes through the encoder and the reference pulse when passing through the encoder is encoded with information which is uncorrelated with that of the encoding of the signal pulse;
detecting variations in the phase of said reference pulse; and
integrating a count rate of said reference pulse.

* * * * *